US011877295B2

(12) United States Patent
Zewail et al.

(10) Patent No.: US 11,877,295 B2
(45) Date of Patent: Jan. 16, 2024

(54) DOWNLINK ASSIGNMENT INDEX PROCESSING IN MULTIPLE PHYSICAL DOWNLINK SHARED CHANNEL SCENARIOS

(71) Applicant: QUALCOMM Incorporated, San Diego, CA (US)

(72) Inventors: Ahmed Abdelaziz Ibrahim Abdelaziz Zewail, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/649,743

(22) Filed: Feb. 2, 2022

(65) Prior Publication Data
US 2022/0361228 A1 Nov. 10, 2022

Related U.S. Application Data

(60) Provisional application No. 63/201,711, filed on May 10, 2021.

(51) Int. Cl.
*H04W 72/23* (2023.01)
*H04W 72/04* (2023.01)
*H04L 5/00* (2006.01)
*H04W 72/0446* (2023.01)

(52) U.S. Cl.
CPC .......... *H04W 72/23* (2023.01); *H04L 5/0044* (2013.01); *H04W 72/0446* (2013.01)

(58) Field of Classification Search
CPC .. H04W 72/23; H04W 72/0446; H04L 5/0044
See application file for complete search history.

(56) References Cited

U.S. PATENT DOCUMENTS

2020/0213981 A1 7/2020 Park et al.
2022/0303064 A1* 9/2022 Yang ............... H04L 1/1685

FOREIGN PATENT DOCUMENTS

WO  WO-2020204526 A1  10/2020

OTHER PUBLICATIONS

International Search Report and Written Opinion - PCT/US2022/072185—ISA/EPO—Aug. 23, 2022.
Moderator (OPPO): "Summary#1 on UCI Enhancements for R16 URLLC", 3GPP TSG RAN WG1 #101, R1-2004674, 3rd Generation Partnership Project, Mobile Competence Centre, 650, Route Des Lucioles, F-06921 Sophia-Antipolis Cedex, France, vol. RAN WG1, No. e-Meeting, May 25, 2020-Jun. 5, 2020, May 20, 2020, 65 Pages, XP051887174, sections 1-7.

* cited by examiner

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive a grant associated with a plurality of physical shared channel resources. The UE may transmit a communication, associated with the grant, including a downlink assignment index field with a value calculated based at least in part on the plurality of physical shared channels, wherein a configuration of the downlink assignment index field is based at least in part on a quantity of start and length indicator values configured for the UE. Numerous other aspects are described.

30 Claims, 11 Drawing Sheets

US 11,877,295 B2

DOWNLINK ASSIGNMENT INDEX PROCESSING IN MULTIPLE PHYSICAL DOWNLINK SHARED CHANNEL SCENARIOS

CROSS-REFERENCE TO RELATED APPLICATION

This Patent Application claims priority to U.S. Provisional Patent Application No. 63/201,711, filed on May 10, 2021, entitled "DOWNLINK ASSIGNMENT INDEX PROCESSING IN MULTIPLE PHYSICAL DOWNLINK SHARED CHANNEL SCENARIOS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for downlink assignment index processing in multiple physical downlink shared channel scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations or network entities that support communication for a user equipment (UE) or multiple UEs. A UE may communicate with a network entity via downlink communications and uplink communications. "Downlink" (or "DL") refers to a communication link from the network entity to the UE, and "uplink" (or "UL") refers to a communication link from the UE to the network entity.

The above multiple access technologies have been adopted in various telecommunication standards to provide a common protocol that enables different UEs to communicate on a municipal, national, regional, and/or global level. 5G, which may be referred to as New Radio (NR), is a set of enhancements to the LTE mobile standard promulgated by the 3GPP. 5G is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in 4G, 5G, and other radio access technologies remain useful.

SUMMARY

A single downlink control information (DCI) message may include a grant for a plurality of physical downlink shared channel (PDSCH) resources. For example, a network entity may transmit a single DCI to schedule up to 8 PDSCH resources for a subcarrier spacing (SCS) of 480 kilohertz (kHz) or 960 kHz in some communications systems. When using a dynamic codebook, a UE may signal a downlink assignment index (DAI) to indicate a correspondence between a feedback message and a resource to which the feedback message applies. The DAI may be determined on a per-DCI basis, a per PDSCH basis, or a per PDSCH group basis, among other examples. However, a size of the DAI field may be limited in some communications systems, which may prevent usage in a per-PDSCH scenario with a single DCI scheduling a plurality of PDSCH resources. The DAI field can be configured for a maximum quantity of PDSCH resources that the network entity is expected to configure for the UE; however, basing the DAI field size on the maximum quantity of PDSCH resources may result in an unnecessary utilization of network resources when a network entity configures a UE with fewer than the maximum quantity of PDSCH resources.

Some aspects described herein may enable an increase to a size of a DAI field and may enable a UE to increment the DAI field in a deterministic manner to enable the UE and a network entity to remain synchronized with respect to feedback messages, such as when using hybrid automatic repeat request (HARQ) feedback. For example, a UE may set the DAI field based at least in part on a greatest common divisor of a quantity of start and length indicator values (SLIVs) in a row of a time domain resource allocation table. In this way, the UE transmits a DAI that enables indication of a correspondence between feedback messages and resources to which the feedback messages apply without using an excessive quantity of network resources for transmission of the DAI. Although some aspects are described herein in terms of PDSCH resources, it should be understood that aspects described herein apply to other types of channel resources, such as physical uplink shared channel (PUSCH) resources among other examples.

In some aspects, a UE for wireless communication includes a memory, and one or more processors, coupled to the memory, configured to: receive a grant associated with a plurality of physical shared channel resources; and transmit a communication, associated with the grant, including a downlink assignment index field with a value calculated based at least in part on the plurality of physical shared channels, wherein a configuration of the downlink assignment index field is based at least in part on a quantity of start and length indicator values configured for the UE.

In some aspects, a network entity for wireless communication includes a memory, and one or more processors, coupled to the memory, configured to: transmit, to a UE, a grant associated with a plurality of physical shared channel resources; and receive a communication, associated with the grant, including a downlink assignment index field with a value calculated based at least in part on the plurality of physical shared channels, wherein a configuration of the downlink assignment index field is based at least in part on a quantity of start and length indicator values configured for the UE.

In some aspects, a method of wireless communication performed by a UE includes receiving a grant associated with a plurality of physical shared channel resources; and transmitting a communication, associated with the grant, including a downlink assignment index field with a value calculated based at least in part on the plurality of physical shared channels, wherein a configuration of the downlink assignment index field is based at least in part on a quantity of start and length indicator values configured for the UE.

In some aspects, a method of wireless communication performed by a network entity includes transmitting, to a UE, a grant associated with a plurality of physical shared channel resources; and receiving a communication, associated with the grant, including a downlink assignment index field with a value calculated based at least in part on the plurality of physical shared channels, wherein a configuration of the downlink assignment index field is based at least in part on a quantity of start and length indicator values configured for the UE.

In some aspects, a non-transitory computer-readable medium storing a set of instructions for wireless communication includes one or more instructions that, when executed by one or more processors of a UE, cause the UE to: receive a grant associated with a plurality of physical shared channel resources; and transmit a communication, associated with the grant, including a downlink assignment index field with a value calculated based at least in part on the plurality of physical shared channels, wherein a configuration of the downlink assignment index field is based at least in part on a quantity of start and length indicator values configured for the UE.

In some aspects, a non-transitory computer-readable medium storing a set of instructions for wireless communication includes one or more instructions that, when executed by one or more processors of a network entity, cause the network entity to: transmit, to a UE, a grant associated with a plurality of physical shared channel resources; and receive a communication, associated with the grant, including a downlink assignment index field with a value calculated based at least in part on the plurality of physical shared channels, wherein a configuration of the downlink assignment index field is based at least in part on a quantity of start and length indicator values configured for the UE.

In some aspects, an apparatus for wireless communication includes means for receiving a grant associated with a plurality of physical shared channel resources; and means for transmitting a communication, associated with the grant, including a downlink assignment index field with a value calculated based at least in part on the plurality of physical shared channels, wherein a configuration of the downlink assignment index field is based at least in part on a quantity of start and length indicator values configured for the apparatus.

In some aspects, an apparatus for wireless communication includes means for transmitting, to a UE, a grant associated with a plurality of physical shared channel resources; and means for receiving a communication, associated with the grant, including a downlink assignment index field with a value calculated based at least in part on the plurality of physical shared channels, wherein a configuration of the downlink assignment index field is based at least in part on a quantity of start and length indicator values configured for the UE.

In some aspects, a UE for wireless communication includes a memory, and one or more processors, coupled to the memory, configured to: receive a grant associated with a plurality of physical shared channel resources; and transmit a communication associated with the grant, wherein the communication is associated with at least one of a first sub-codebook for a first type of downlink control information or a second sub-codebook for a second type of downlink control information.

In some aspects, a method of wireless communication performed by a UE includes receiving a grant associated with a plurality of physical shared channel resources; and transmitting a communication associated with the grant, wherein the communication is associated with at least one of a first sub-codebook for a first type of downlink control information or a second sub-codebook for a second type of downlink control information.

In some aspects, a non-transitory computer-readable medium storing a set of instructions for wireless communication includes one or more instructions that, when executed by one or more processors of a UE, cause the UE to: receive a grant associated with a plurality of physical shared channel resources; and transmit a communication associated with the grant, wherein the communication is associated with at least one of a first sub-codebook for a first type of downlink control information or a second sub-codebook for a second type of downlink control information.

In some aspects, an apparatus for wireless communication includes means for receiving a grant associated with a plurality of physical shared channel resources; and means for transmitting a communication associated with the grant, wherein the communication is associated with at least one of a first sub-codebook for a first type of downlink control information or a second sub-codebook for a second type of downlink control information.

In some aspects, a network entity for wireless communication includes a memory, and one or more processors, coupled to the memory, configured to: transmit a grant associated with a plurality of physical shared channel resources; and receive a communication associated with the grant, wherein the communication is associated with at least one of a first sub-codebook for a first type of downlink control information or a second sub-codebook for a second type of downlink control information.

In some aspects, a method of wireless communication performed by a network entity includes transmitting a grant associated with a plurality of physical shared channel resources; and receiving a communication associated with the grant, wherein the communication is associated with at least one of a first sub-codebook for a first type of downlink control information or a second sub-codebook for a second type of downlink control information.

In some aspects, a non-transitory computer-readable medium storing a set of instructions for wireless communication includes one or more instructions that, when executed by one or more processors of a network entity, cause the network entity to: receive a grant associated with a plurality of physical shared channel resources; and transmit a communication associated with the grant, wherein the communication is associated with at least one of a first sub-codebook for a first type of downlink control information or a second sub-codebook for a second type of downlink control information.

In some aspects, an apparatus for wireless communication includes means for transmitting a grant associated with a plurality of physical shared channel resources; and means for receiving a communication associated with the grant, wherein the communication is associated with at least one of a first sub-codebook for a first type of downlink control information or a second sub-codebook for a second type of downlink control information.

Aspects generally include a method, apparatus, system, computer program product, non-transitory computer-readable medium, user equipment, base station, network entity, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
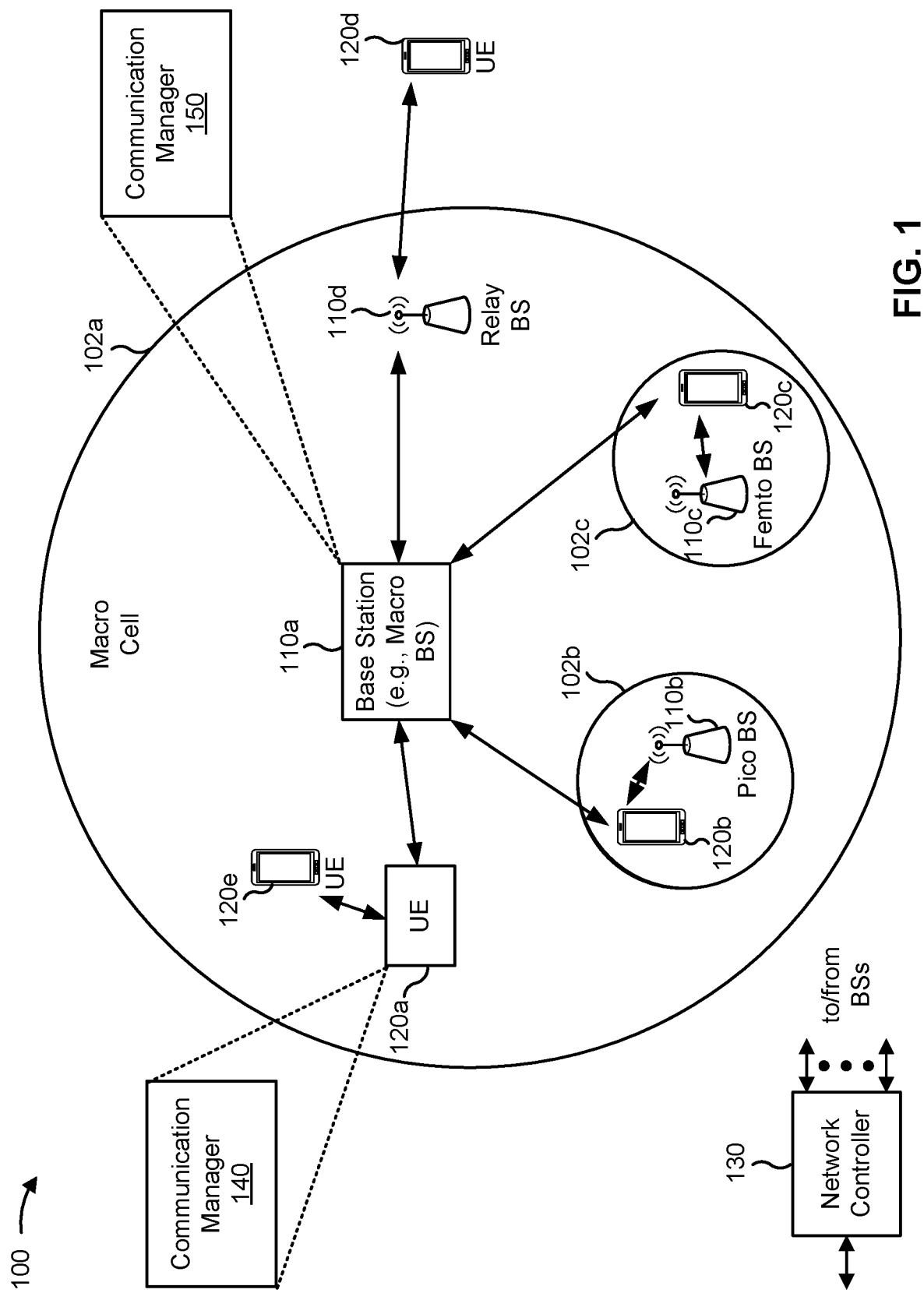
FIG. 1 is diagram illustrating an example of a wireless network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating a wireless network 100 in which aspects of the present disclosure may be practiced. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is a network entity that communicates with UEs 120. Although some aspects are described herein in terms of a base station, other types of network entities may be possible. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a grant associated with a plurality of physical shared channel resources; and transmit a communication, associated with the grant, including a downlink assignment index field with a value calculated based at least in part on the plurality of physical shared channels, wherein a configuration of the downlink assignment index field is based at least in part on a quantity of start and length indicator values configured for the UE. In some aspects, the communication manager 140 may receive a grant associated with a plurality of physical shared channel resources; and transmit a communication associated with the grant, wherein the communication is associated with at least one of a first sub-codebook for a first type of downlink control information or a second sub-codebook for a second type of downlink control information. Additionally, or alternatively, the communication manager 140 may perform one or more other operations described herein.

In some aspects, the base station 110 may include a communication manager 150. As described in more detail elsewhere herein, the communication manager 150 may transmit, to a UE, a grant associated with a plurality of physical shared channel resources; and receive a communication, associated with the grant, including a downlink assignment index field with a value calculated based at least in part on the plurality of physical shared channels, wherein a configuration of the downlink assignment index field is based at least in part on a quantity of start and length indicator values configured for the UE. In some aspects, the communication manager 150 may transmit a grant associated with a plurality of physical shared channel resources; and receive a communication associated with the grant, wherein the communication is associated with at least one of a first sub-codebook for a first type of downlink control information or a second sub-codebook for a second type of downlink control information. Additionally, or alternatively, the communication manager 150 may perform one or more other operations described herein.

As indicated above, FIG. 1 is provided as an example. Other examples may differ from what is described with regard to FIG. 1.

Figure 2:
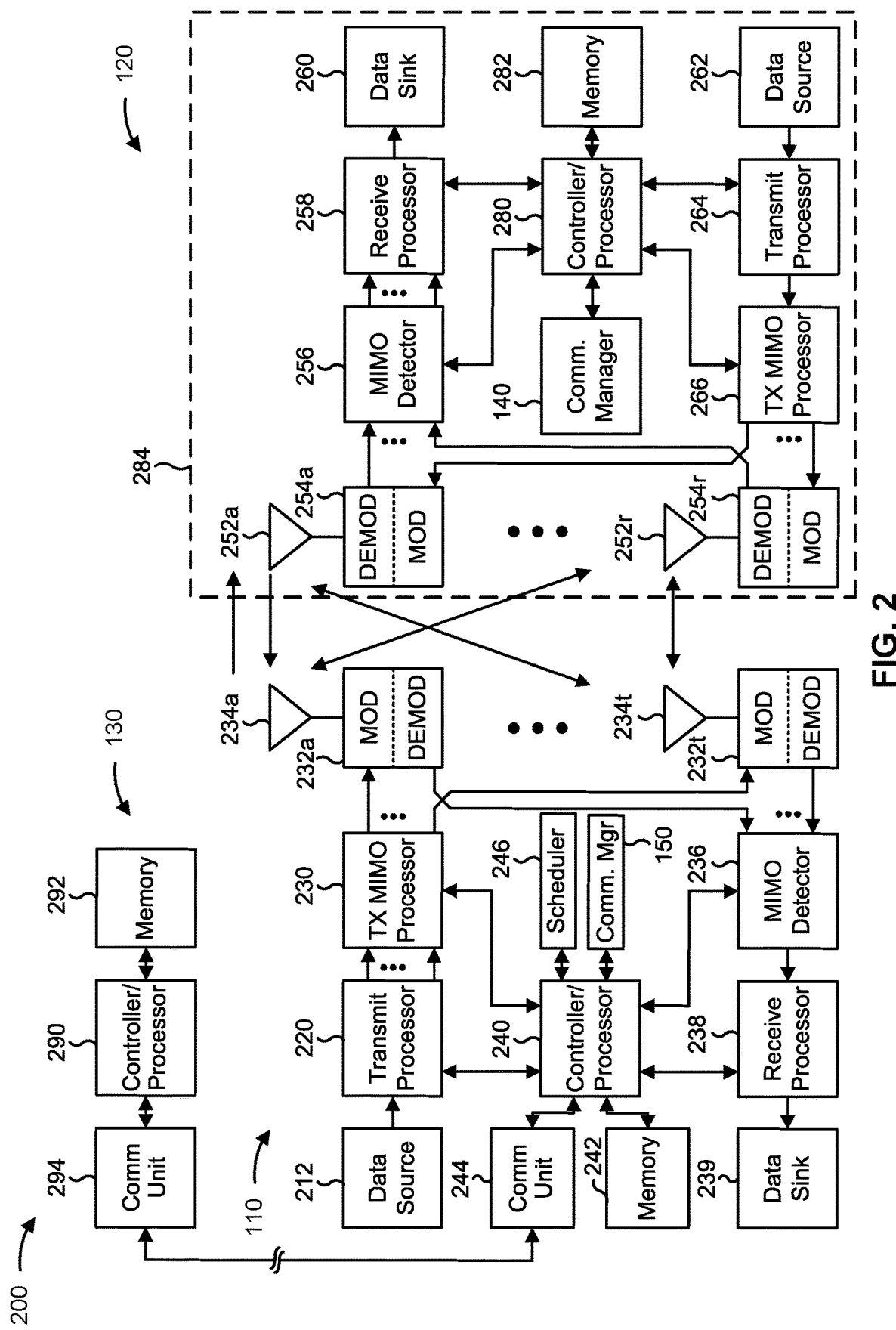
FIG. 2 is a diagram illustrating an example of a base station or other network entity in communication with a user UE in a wireless network.

FIG. 2 is a diagram illustrating an example 200 of a base station 110 or other network entity in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with downlink assignment index processing in multiple physical downlink shared channel scenarios, as described in more detail elsewhere herein. For example, the controller/processor 240 of the base station 110, the controller/processor 280 of the UE 120, and/or any other component(s) of FIG. 2 may perform or direct operations of, for example, method 400 of FIG. 4, method 500 of FIG. 5, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, method 400 of FIG. 4, method 500 of FIG. 5, and/or other processes as described herein. In some examples, executing instructions may include running the instructions, converting the instructions, compiling the instructions, and/or interpreting the instructions, among other examples.

In some aspects, a UE includes means for receiving a grant associated with a plurality of physical shared channel resources; and/or means for transmitting a communication, associated with the grant, including a downlink assignment index field with a value calculated based at least in part on the plurality of physical shared channels, wherein a configuration of the downlink assignment index field is based at least in part on a quantity of start and length indicator values configured for the UE. In some aspects, the UE includes means for receiving a grant associated with a plurality of physical shared channel resources; and transmitting a communication associated with the grant, wherein the communication is associated with at least one of a first sub-codebook for a first type of downlink control information or a second sub-codebook for a second type of downlink control information. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a network entity, such as a base station or another network entity described herein, includes means for transmitting, to a UE, a grant associated with a plurality of physical shared channel resources; and/or means for receiving a communication, associated with the grant, including a downlink assignment index field with a value calculated based at least in part on the plurality of physical shared channels, wherein a configuration of the downlink assignment index field is based at least in part on a quantity of start and length indicator values configured for the UE. In some aspects, the base station includes means for transmitting a grant associated with a plurality of physical shared channel resources; and receiving a communication associated with the grant, wherein the communication is associated with at least one of a first sub-codebook for a first type of downlink control information or a second sub-codebook for a second type of downlink control information. The means for the network entity to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. Additionally, or alternatively, the means for the network entity to perform operations described herein may include other components or one or more of the aforementioned components may be included in another type of network entity.

As indicated above, FIG. 2 is provided as an example. Other examples may differ from what is described with regard to FIG. 2.

Figure 3:
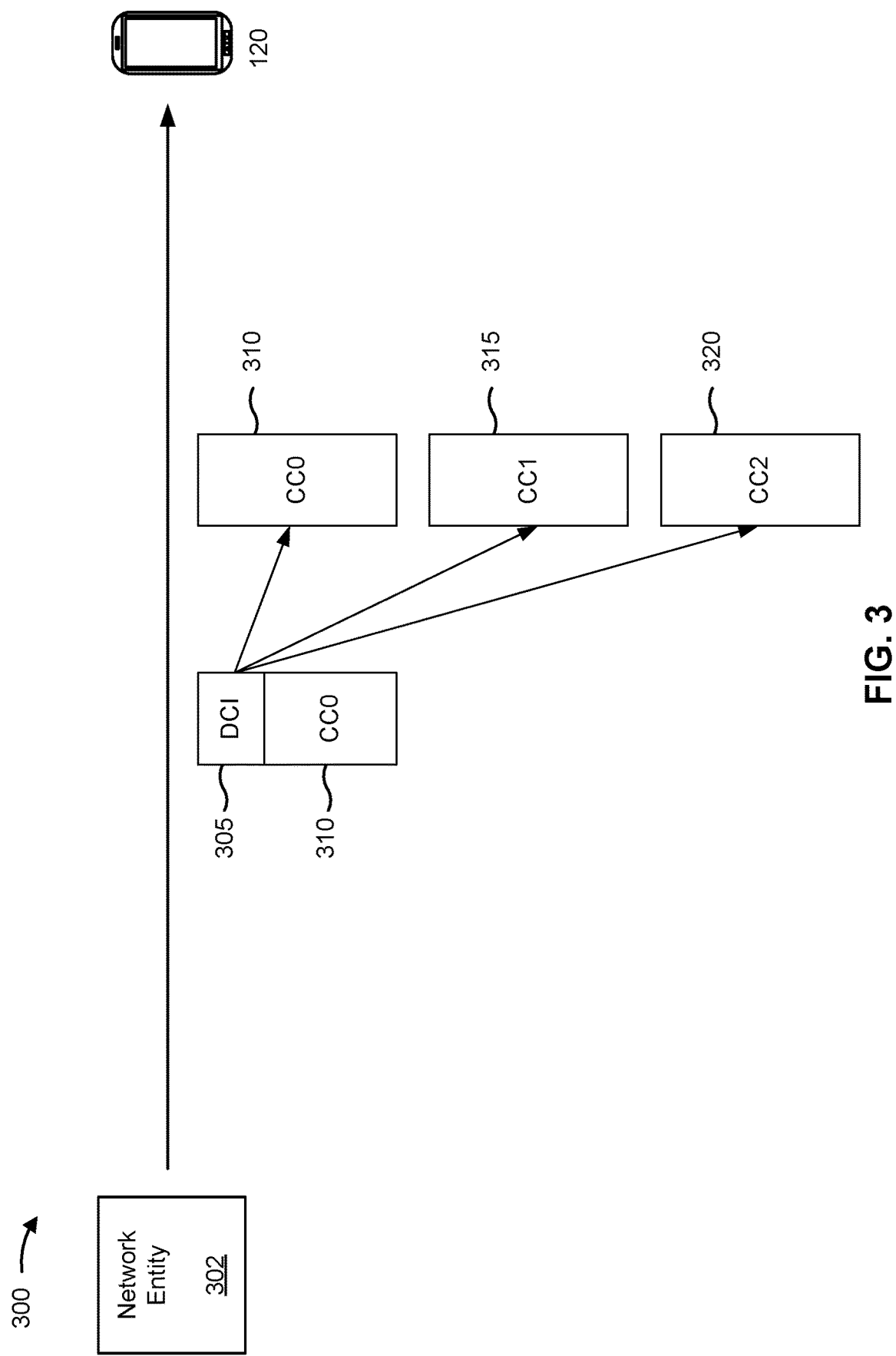
FIG. 3 is a diagram illustrating an example of downlink control information that schedules multiple cells.

FIG. 3 is a diagram illustrating an example 300 of downlink control information (DCI) that schedules multiple cells, in accordance with the present disclosure. As shown in FIG. 3, a network entity 302 and a UE 120 may communicate with one another.

The network entity 302 may transmit, to the UE 120, DCI 305 that schedules multiple communications for the UE 120. The multiple communications may be scheduled for at least two different cells. In some cases, a cell may be referred to as a component carrier (CC). In some cases, DCI that schedules a communication for a cell via which the DCI is transmitted may be referred to as self-carrier (or self-cell) scheduling DCI. In some cases, DCI that schedules a communication for a cell via which the DCI is transmitted may be referred to as cross-carrier (or cross-cell) scheduling DCI. In some aspects, the DCI 305 may be cross-carrier scheduling DCI, and may or may not be self-carrier scheduling DCI. In some aspects, the DCI 305 that carries communications in at least two cells may be referred to as combination DCI.

In example 300, the DCI 305 schedules a communication for a first cell 310 that carries the DCI 305 (shown as CC0), schedules a communication for a second cell 315 that does not carry the DCI 305 (shown as CC1), and schedules a communication for a third cell 320 that does not carry the DCI 305 (shown as CC2). In some aspects, the DCI 305 may schedule communications on a different number of cells than shown in FIG. 3 (e.g., two cells, four cells, five cells, and so on). The number of cells may be greater than or equal to two.

A communication scheduled by the DCI 305 may include a data communication, such as a physical downlink shared channel (PDSCH) communication or a physical uplink shared channel (PUSCH) communication. For a data communication, the DCI 305 may schedule a single transport block (TB) across multiple cells or may separately schedule multiple TBs in the multiple cells. Additionally, or alternatively, a communication scheduled by the DCI 305 may include a reference signal, such as a channel state information reference signal (CSI-RS) or a sounding reference signal (SRS). For a reference signal, the DCI 305 may trigger a single resource for reference signal transmission across multiple cells or may separately schedule multiple resources for reference signal transmission in the multiple cells. In some cases, scheduling information in the DCI 305 may be indicated once and reused for multiple communications (e.g., on different cells), such as a modulation and coding scheme (MCS), a resource to be used for acknowledgement (ACK) or negative acknowledgement (NACK) of a communication scheduled by the DCI 305, and/or a resource allocation for a scheduled communication, to conserve signaling overhead.

As indicated above, FIG. 3 is provided as an example. Other examples may differ from what is described with respect to FIG. 3.

Figure 4:
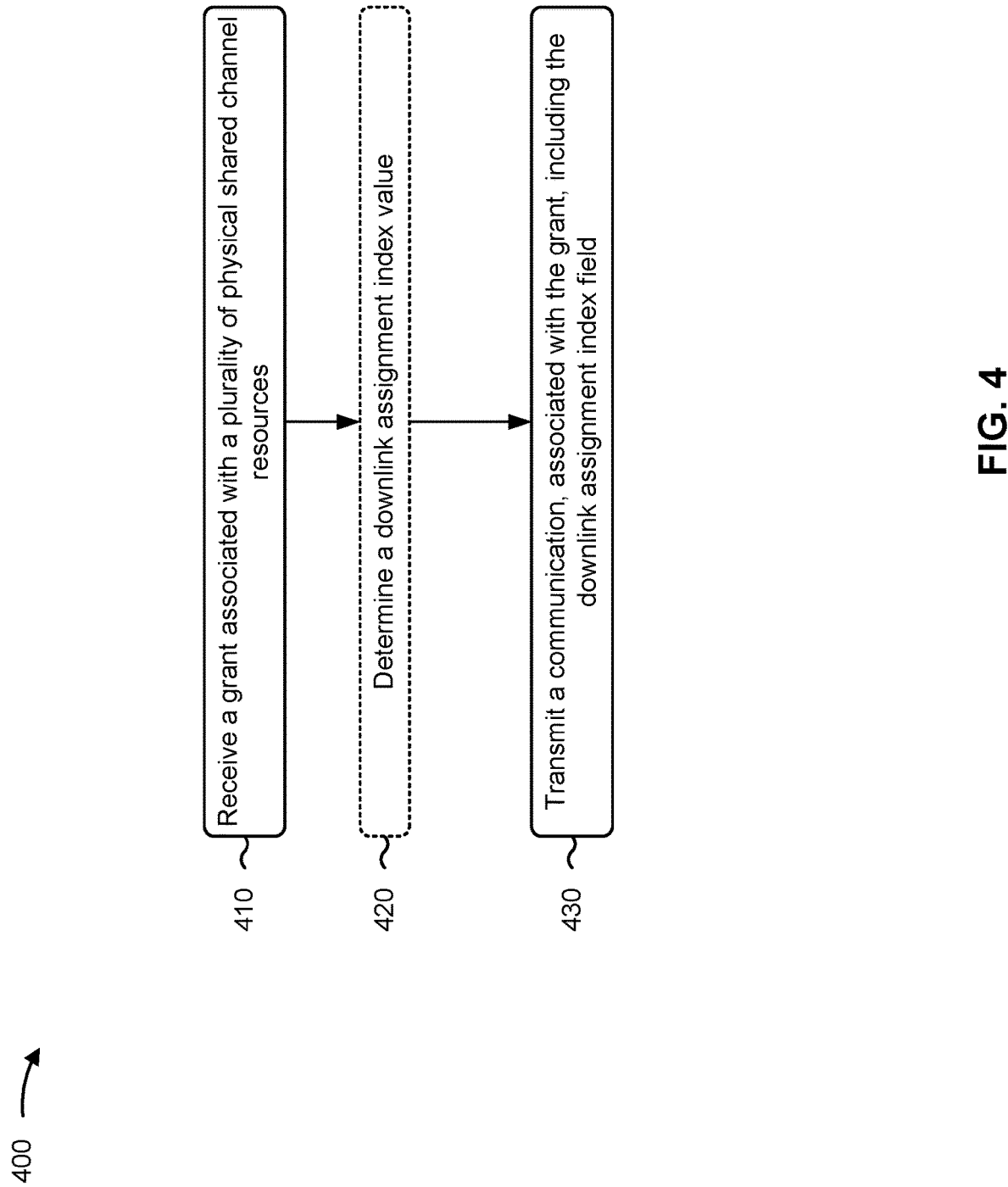
FIGS. 4-5 are flowcharts of example methods of wireless communication.

FIG. 4 is a flowchart of an example method 400 of wireless communication. The method 400 may be performed by, for example, a UE (e.g., UE 120).

At 410, the UE may receive a grant associated with a plurality of physical shared channel resources. For example, the UE (e.g., using communication manager 640 and/or reception component 602, depicted in FIG. 6) may receive a grant associated with a plurality of physical shared channel resources, as described herein. In some aspects, the plurality of physical shared channel resources includes at least one of at least one physical uplink shared channel resource or at least one physical downlink shared channel resource.

At 420, in some aspects, the UE may determine a downlink assignment index value. For example, the UE (e.g., using communication manager 640 and/or determination component 608, depicted in FIG. 6) may determine a downlink assignment index value, as described herein. In some aspects, an increment of the downlink assignment index indicates a fixed quantity of feedback bits for downlink control information type 1_1 and for downlink control information type 1_0. In some aspects, the downlink assignment index field is not incremented based at least in part on a skipped physical shared channel resource, of the plurality of physical shared channel resources, that overlaps with a time-division duplexed uplink transmission.

At 430, the UE may transmit a communication, associated with the grant, including a downlink assignment index field. For example, the UE (e.g., using communication manager 640 and/or transmission component 604, depicted in FIG. 6) may transmit a communication, associated with the grant, including a downlink assignment index field with a value calculated based at least in part on the plurality of physical shared channels, as described herein. In some aspects, a configuration of the downlink assignment index field is based at least in part on a quantity of start and length indicator values configured for the UE. In some aspects, the configuration of the downlink assignment index field is based at least in part on a greatest common divisor of the quantity of start and length indicator values in each row of a time domain resource allocation table configured for the UE.

In some aspects, the configuration of the downlink assignment index is based at least in part on a radio resource control configuration received from a network entity. In some aspects, a plurality of sub-codebooks are defined based at least in part on a time domain resource allocation table configured for the UE, and wherein the configuration of the downlink assignment index field is based at least in part on a sub-code book of the plurality of sub-codebooks. In some aspects, a division of the time domain resource allocation table into sub-codebooks, of the plurality of sub-codebooks, is based at least in part on a radio resource control configuration.

In some aspects, the communication is associated with another grant of a plurality of physical uplink shared channel resources and includes a plurality of downlink assignment indices corresponding to a plurality of groupings associated with a time domain resource allocation table. In some aspects, the communication is associated with another grant of a plurality of physical uplink shared channel resources and includes a single downlink assignment index corresponding to a plurality of groupings associated with a time domain resource allocation table. In some aspects, a first sub-codebook is defined for a first type of downlink control information and a second sub-codebook is defined for a second type of downlink control information, and feedback bits associated with the downlink assignment index field are grouped in a common sub-codebook of the first sub-codebook or the second sub-codebook.

In some aspects, a quantity of physical shared channel resources, of the plurality of physical shared channel resources, that overlap with a time-division duplexed uplink transmission is less than a quantity of physical shared channel resources per downlink assignment index increment for the downlink assignment index field, and wherein the communication includes a feedback indicator of the physical shared channel resources. In some aspects, a quantity of physical shared channel resources, of the plurality of physical shared channel resources, that overlap with a time-division duplexed uplink transmission is not less than a quantity of physical shared channel resources per downlink assignment index increment for the downlink assignment index field, and the communication includes a feedback indicator of the physical shared channel resources and the downlink assignment index field is incremented based at least in part on a quantity of start and length indicator values in a time domain resources assignment table. In some aspects, a quantity of physical shared channel resources, of the plurality of physical shared channel resources, that overlap with a time-division duplexed uplink transmission is not less than a quantity of physical shared channel resources per downlink assignment index increment for the downlink assignment index field, the communication includes a feedback indicator of a subset of the physical shared channel resources, and the downlink assignment index field is incremented based at least in part on a quantity of start and length indicator values in a time domain resources assignment table and the subset of the physical shared channel resources.

Although FIG. 4 shows example blocks of method 400, in some aspects, method 400 may include additional blocks, fewer blocks, different blocks, or differently arranged blocks than those depicted in FIG. 4. Additionally, or alternatively, two or more of the blocks of method 400 may be performed in parallel.

Figure 5:
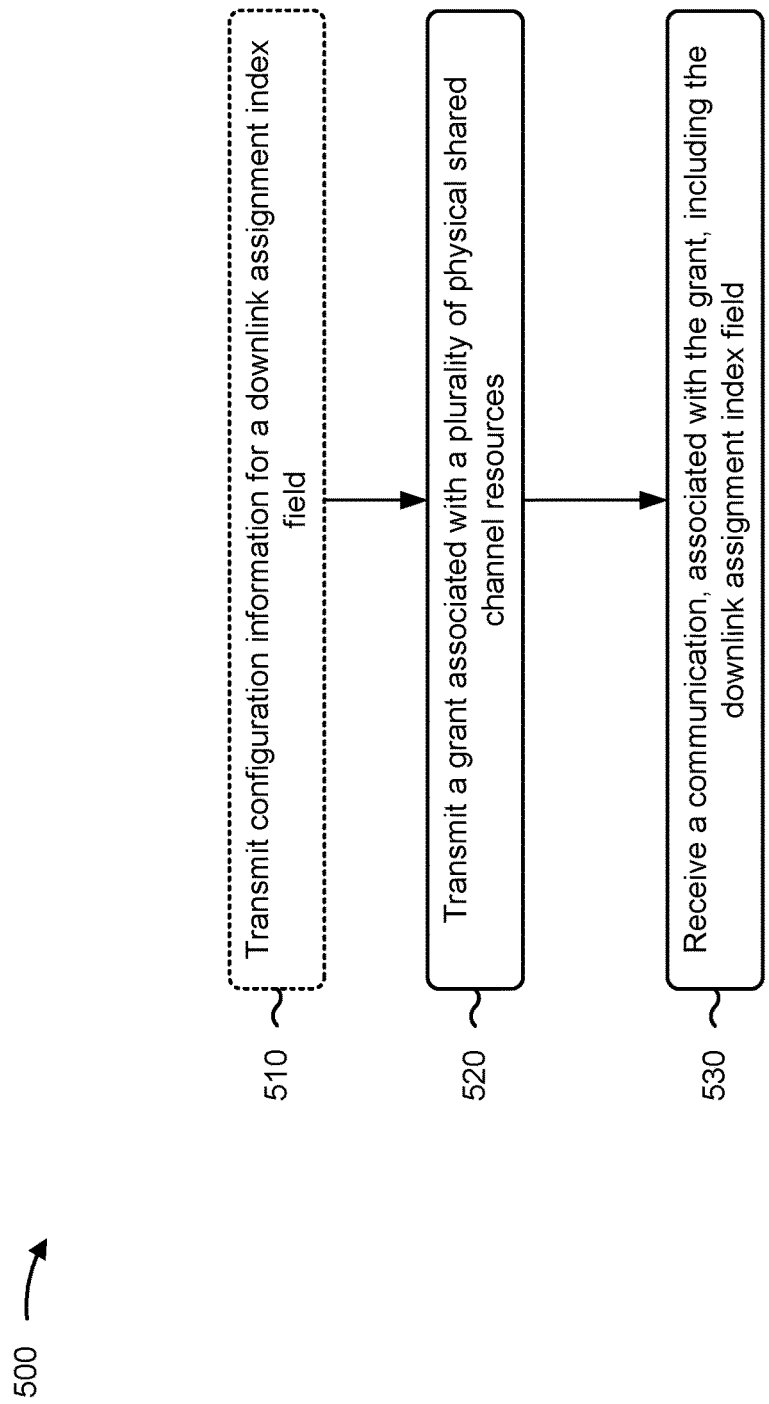

FIG. 5 is a flowchart of an example method 500 of wireless communication. The method 500 may be performed by, for example, a network entity (e.g., base station 110, network entity 302, apparatus 800, network entity 1002, or a unit of FIG. 11, among other examples).

At 510, in some aspects, the network entity may transmit configuration information for a downlink assignment index field. For example, the network entity (e.g., using communication manager 850 and/or transmission component 804, depicted in FIG. 8) may transmit configuration information for a downlink assignment index field, as described herein. In some aspects, the configuration of the downlink assignment index field is based at least in part on a greatest common divisor of the quantity of start and length indicator values in each row of a time domain resource allocation table configured for the UE.

In some aspects, the configuration of the downlink assignment index is based at least in part on a radio resource control configuration transmitted by the network entity. In some aspects, a plurality of sub-codebooks are defined based at least in part on a time domain resource allocation table configured for the UE, and the configuration of the downlink assignment index field is based at least in part on a sub-code book of the plurality of sub-codebooks. In some aspects, a division of the time domain resource allocation table into sub-codebooks, of the plurality of sub-codebooks, is based at least in part on a radio resource control configuration.

At 520, the network entity may transmit a grant associated with a plurality of physical shared channel resources. For example, the network entity (e.g., using communication manager 850 and/or transmission component 804, depicted in FIG. 8) may transmit a grant associated with a plurality of physical shared channel resources, as described herein. In some aspects, the plurality of physical shared channel resources includes at least one of at least one physical uplink shared channel resource or at least one physical downlink shared channel resource.

At 530, the network entity may receive a communication, associated with the grant, including a downlink assignment index field. For example, the network entity (e.g., using communication manager 850 and/or reception component 802, depicted in FIG. 8) may receive a communication, associated with the grant, including a downlink assignment index field with a value calculated based at least in part on the plurality of physical shared channels, as described herein. In some aspects, a configuration of the downlink assignment index field is based at least in part on a quantity of start and length indicator values configured for the UE. In some aspects, the communication is associated with another grant of a plurality of physical uplink shared channel resources and includes a plurality of downlink assignment indices corresponding to a plurality of groupings associated with a time domain resource allocation table.

In some aspects, the communication is associated with another grant of a plurality of physical uplink shared channel resources and includes a single downlink assignment index corresponding to a plurality of groupings associated with a time domain resource allocation table. In some aspects, an increment of the downlink assignment index indicates a fixed quantity of feedback bits for downlink control information type 1_1 and for downlink control information type 1_0. In some aspects, a first sub-codebook is defined for a first type of downlink control information and a second sub-codebook is defined for a second type of downlink control information, and feedback bits associated with the downlink assignment index field are grouped in a common sub-codebook of the first sub-codebook or the second sub-codebook. In some aspects, the downlink assignment index field is not incremented based at least in part on a skipped physical shared channel resource, of the plurality of physical shared channel resources, that overlaps with a time-division duplexed uplink transmission.

In some aspects, a quantity of physical shared channel resources, of the plurality of physical shared channel resources, that overlap with a time-division duplexed uplink transmission is less than a quantity of physical shared channel resources per downlink assignment index increment for the downlink assignment index field, and the communication includes a feedback indicator of the physical shared channel resources. In some aspects, a quantity of physical shared channel resources, of the plurality of physical shared channel resources, that overlap with a time-division duplexed uplink transmission is not less than a quantity of physical shared channel resources per downlink assignment index increment for the downlink assignment index field, and the communication includes a feedback indicator of the physical shared channel resources and the downlink assignment index field is incremented based at least in part on a quantity of start and length indicator values in a time domain resources assignment table. In some aspects, a quantity of physical shared channel resources, of the plurality of physical shared channel resources, that overlap with a time-division duplexed uplink transmission is not less than a quantity of physical shared channel resources per downlink assignment index increment for the downlink assignment index field, and the communication includes a feedback indicator of a subset of the physical shared channel resources, and the downlink assignment index field is incremented based at least in part on a quantity of start and length indicator values in a time domain resources assignment table and the subset of the physical shared channel resources.

Although FIG. 5 shows example blocks of method 500, in some aspects, method 500 may include additional blocks, fewer blocks, different blocks, or differently arranged blocks than those depicted in FIG. 5. Additionally, or alternatively, two or more of the blocks of method 500 may be performed in parallel.

Figure 6:
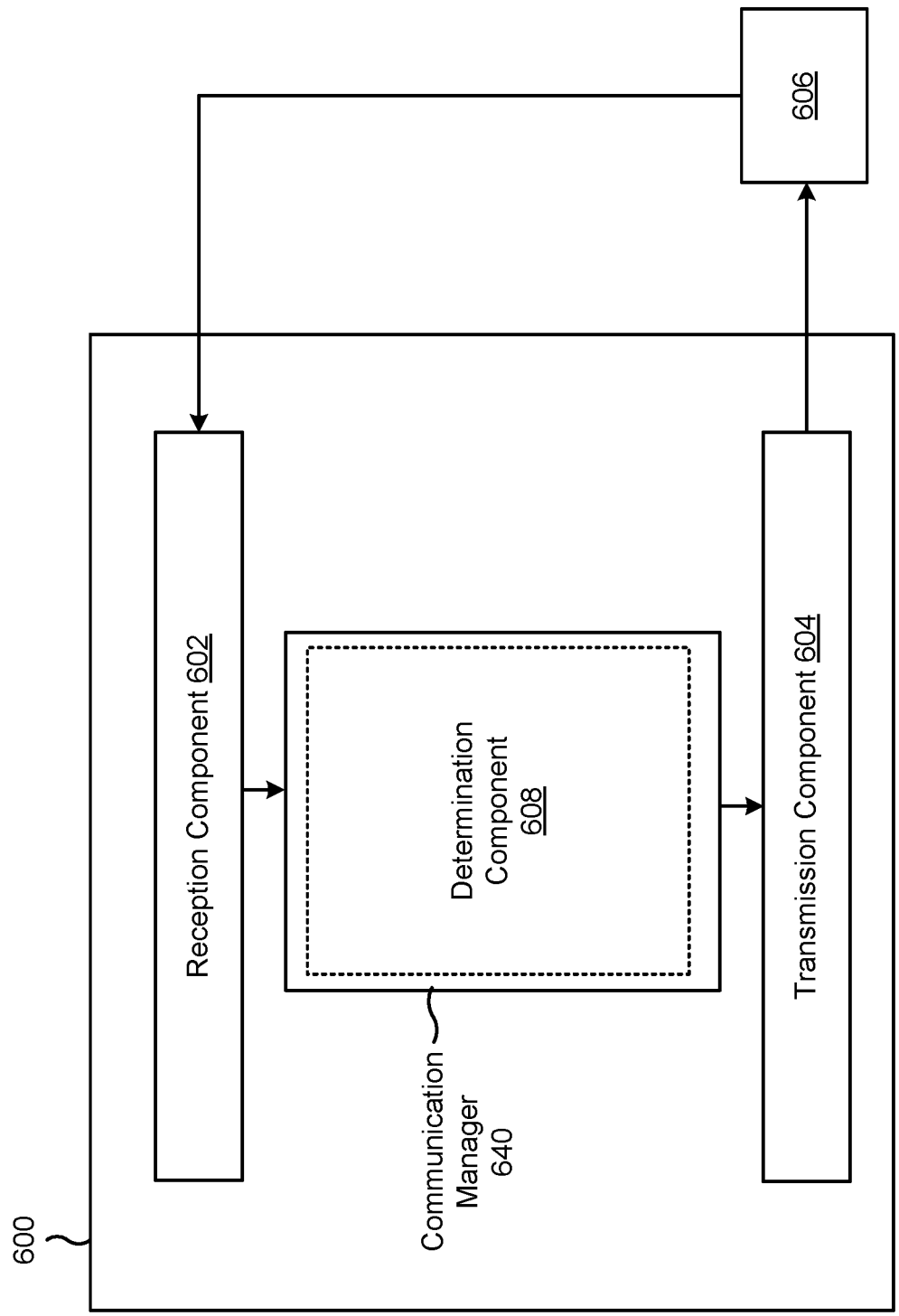
FIGS. 6-7 are block diagrams of example apparatuses for wireless communication.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a network entity, or another wireless communication device) using the reception component 602 and the transmission component 604. As further shown, the apparatus 600 may include the communication manager 640 (the communication manager 640 may be configured to perform one or more functions similar to those performed by the communication manager 140). The communication manager 640 may include a determination component 608, among other examples.

In some aspects, the apparatus 600 may be configured to perform one or more operations described herein. Additionally, or alternatively, the apparatus 600 may be configured to perform one or more methods described herein, such as method 400 of FIG. 4. In some aspects, the apparatus 600 and/or one or more components shown in FIG. 6 may include one or more components of the UE described in connection with FIG. 2. Additionally, or alternatively, one or more components shown in FIG. 6 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 600. In some aspects, the reception component 602 may include one or more antennas, a demodulator, a MIMO detector, a receive processor, a controller/processor, a memory, or a combination thereof, of the UE described in connection with FIG. 2.

The transmission component 604 may transmit communications, such as reference signals, control information, data communications, or a combination thereof, to the apparatus 606. In some aspects, one or more other components of the apparatus 600 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described in connection with FIG. 2. In some aspects, the transmission component 604 may be co-located with the reception component 602 in a transceiver.

The reception component 602 may receive a grant associated with a plurality of physical shared channel resources. The transmission component 604 may transmit a communication, associated with the grant, including a downlink assignment index field with a value calculated based at least in part on the plurality of physical shared channels, wherein a configuration of the downlink assignment index field is based at least in part on a quantity of start and length indicator values configured for the UE. The determination component 608 may determine a downlink assignment index value.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
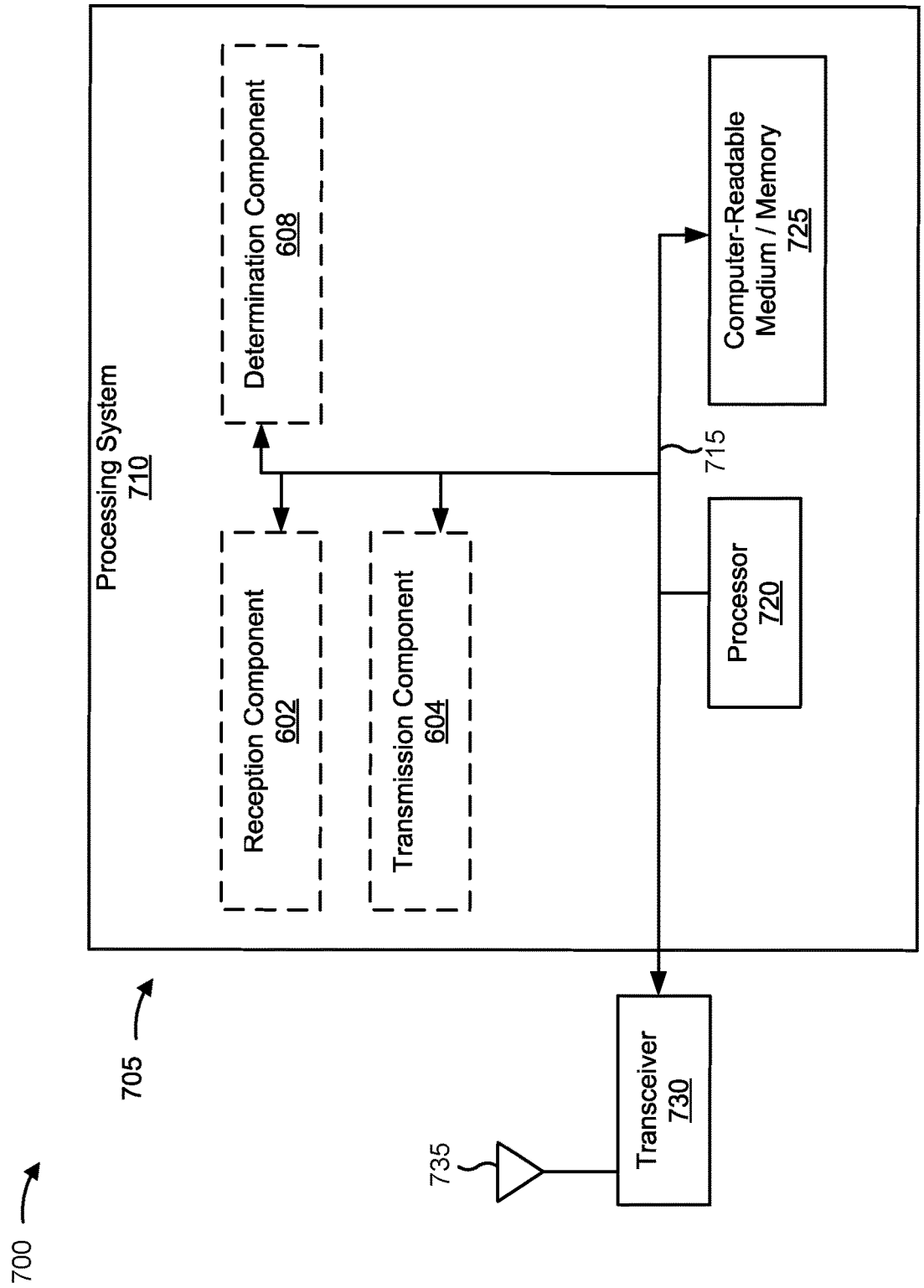

FIG. 7 is a diagram illustrating an example 700 of a hardware implementation for an apparatus 705 employing a processing system 710. The apparatus 705 may be a UE.

The processing system 710 may be implemented with a bus architecture, represented generally by the bus 715. The bus 715 may include any number of interconnecting buses and bridges depending on the specific application of the processing system 710 and the overall design constraints. The bus 715 links together various circuits including one or more processors and/or hardware components, represented by the processor 720, the illustrated components, and the computer-readable medium/memory 725. The bus 715 may also link various other circuits, such as timing sources, peripherals, voltage regulators, and/or power management circuits.

The processing system 710 may be coupled to a transceiver 730. The transceiver 730 is coupled to one or more antennas 735. The transceiver 730 provides a means for communicating with various other apparatuses over a transmission medium. The transceiver 730 receives a signal from the one or more antennas 735, extracts information from the received signal, and provides the extracted information to the processing system 710, specifically the reception component 602. In addition, the transceiver 730 receives information from the processing system 710, specifically the transmission component 604, and generates a signal to be applied to the one or more antennas 735 based at least in part on the received information.

The processing system 710 includes a processor 720 coupled to a computer-readable medium/memory 725. The processor 720 is responsible for general processing, including the execution of software stored on the computer-readable medium/memory 725. The software, when executed by the processor 720, causes the processing system 710 to perform the various functions described herein for any particular apparatus. The computer-readable medium/memory 725 may also be used for storing data that is manipulated by the processor 720 when executing software. The processing system further includes at least one of the illustrated components. The components may be software modules miming in the processor 720, resident/stored in the computer-readable medium/memory 725, one or more hardware modules coupled to the processor 720, or some combination thereof.

In some aspects, the processing system 710 may be a component of the UE 120 and may include the memory 282 and/or at least one of the TX MIMO processor 266, the RX processor 258, and/or the controller/processor 280. In some aspects, the apparatus 705 for wireless communication includes means for receiving a grant associated with a plurality of physical shared channel resources and/or means for transmitting a communication, associated with the grant, including a downlink assignment index field with a value calculated based at least in part on the plurality of physical shared channels, wherein a configuration of the downlink assignment index field is based at least in part on a quantity of start and length indicator values configured for the apparatus 705, among other examples. The aforementioned means may be one or more of the aforementioned components of the apparatus 600 and/or the processing system 710 of the apparatus 705 configured to perform the functions recited by the aforementioned means. As described elsewhere herein, the processing system 710 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 7 is provided as an example. Other examples may differ from what is described in connection with FIG. 7.

Figure 8:
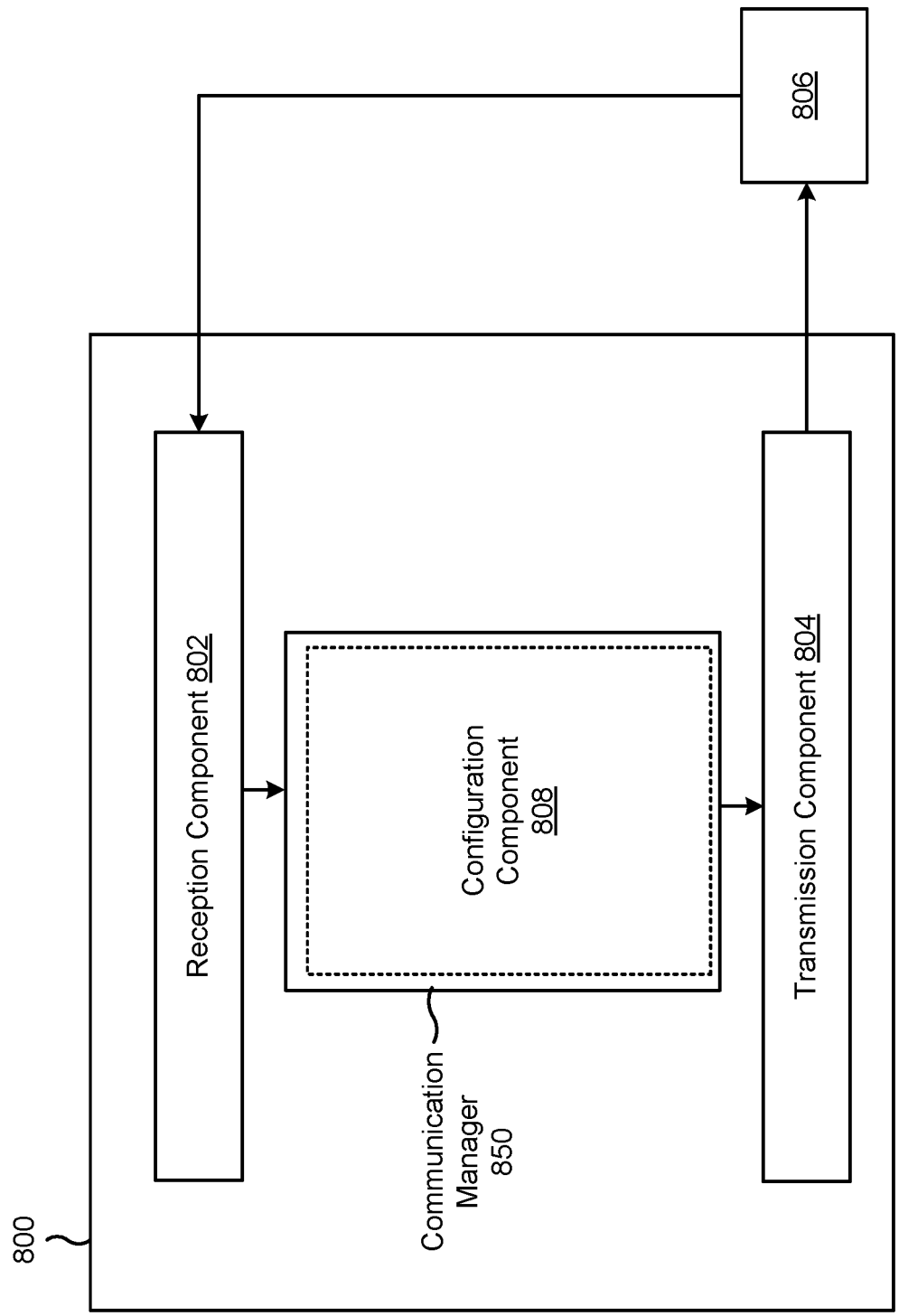
FIG. 8-9 are diagrams illustrating examples of hardware implementation for an apparatus employing a processing system.

FIG. 8 is a block diagram of an example apparatus 800 for wireless communication. The apparatus 800 may be a network entity, or a network entity may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network entity, or another wireless communication device) using the reception component 802 and the transmission component 804. As further shown, the apparatus 800 may include the communication manager 850 (the communication manager 850 may be configured to perform one or more functions similar to those performed by the communication manager 150). The communication manager 850 may include a configuration component 808, among other examples.

In some aspects, the apparatus 800 may be configured to perform one or more operations described herein. Additionally, or alternatively, the apparatus 800 may be configured to perform one or more method described herein, such as method 500 of FIG. 5. In some aspects, the apparatus 800 and/or one or more components shown in FIG. 8 may include one or more components of the network entity described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the network entity described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the network entity described in connection with FIG. 2. In some aspects, the transmission component 804 may be co-located with the reception component 802 in a transceiver.

The configuration component 808 may configure a downlink assignment index field for a UE. The transmission component 804 may transmit, to a UE, a grant associated with a plurality of physical shared channel resources. The reception component 802 may receive a communication, associated with the grant, including a downlink assignment index field with a value calculated based at least in part on the plurality of physical shared channels, wherein a configuration of the downlink assignment index field is based at least in part on a quantity of start and length indicator values configured for the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
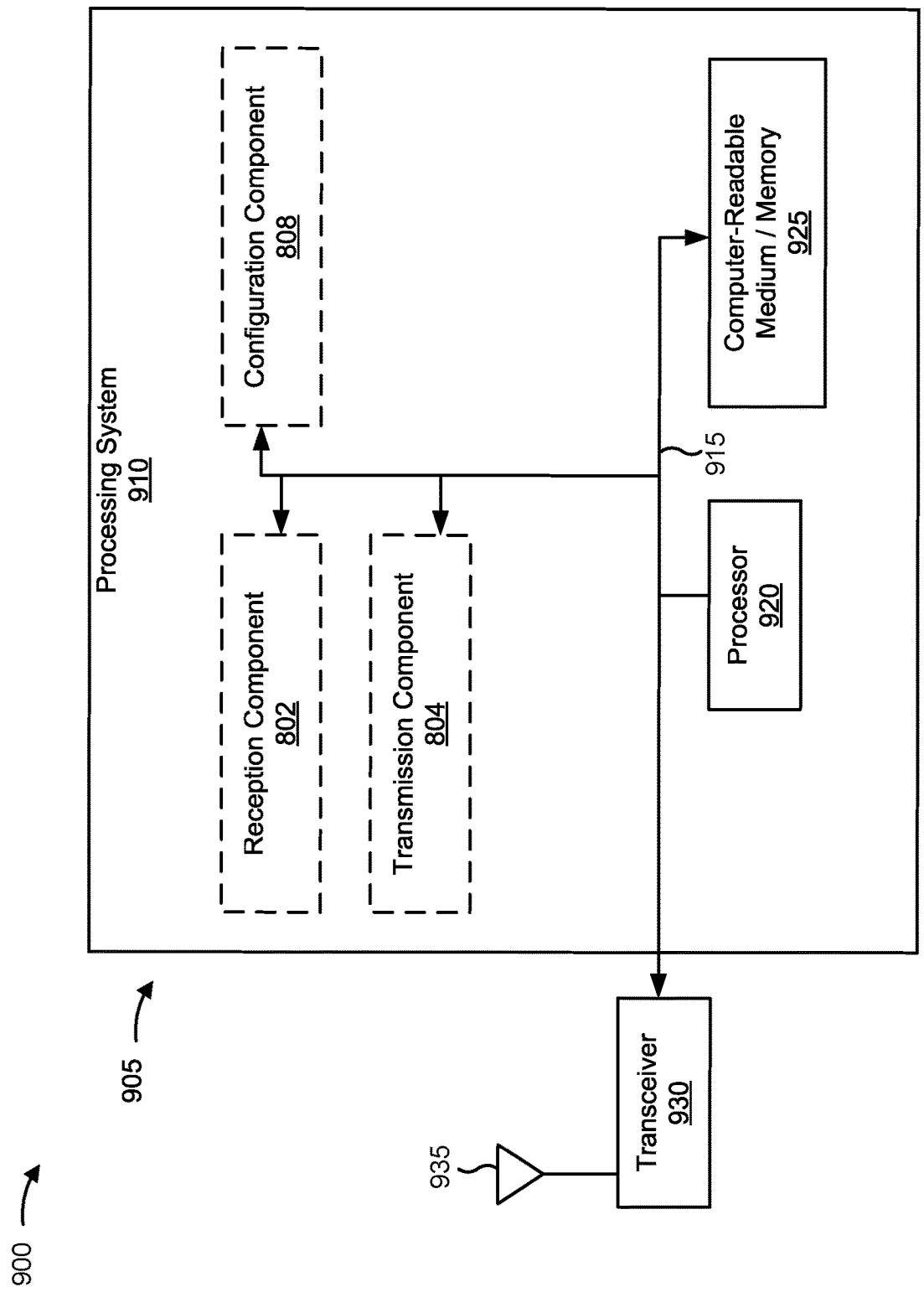

FIG. 9 is a diagram illustrating an example 900 of a hardware implementation for an apparatus 905 employing a processing system 910. The apparatus 905 may be a network entity.

The processing system 910 may be implemented with a bus architecture, represented generally by the bus 915. The bus 915 may include any number of interconnecting buses and bridges depending on the specific application of the processing system 910 and the overall design constraints. The bus 915 links together various circuits including one or more processors and/or hardware components, represented by the processor 920, the illustrated components, and the computer-readable medium/memory 925. The bus 915 may also link various other circuits, such as timing sources, peripherals, voltage regulators, and/or power management circuits.

The processing system 910 may be coupled to a transceiver 930. The transceiver 930 is coupled to one or more antennas 935. The transceiver 930 provides a means for communicating with various other apparatuses over a transmission medium. The transceiver 930 receives a signal from the one or more antennas 935, extracts information from the received signal, and provides the extracted information to the processing system 910, specifically the reception component 802. In addition, the transceiver 930 receives information from the processing system 910, specifically the transmission component 804, and generates a signal to be applied to the one or more antennas 935 based at least in part on the received information.

The processing system 910 includes a processor 920 coupled to a computer-readable medium/memory 925. The processor 920 is responsible for general processing, including the execution of software stored on the computer-readable medium/memory 925. The software, when executed by the processor 920, causes the processing system 910 to perform the various functions described herein for any particular apparatus. The computer-readable medium/memory 925 may also be used for storing data that is manipulated by the processor 920 when executing software. The processing system further includes at least one of the illustrated components. The components may be software modules running in the processor 920, resident/stored in the computer-readable medium/memory 925, one or more hardware modules coupled to the processor 920, or some combination thereof.

Figure 11:
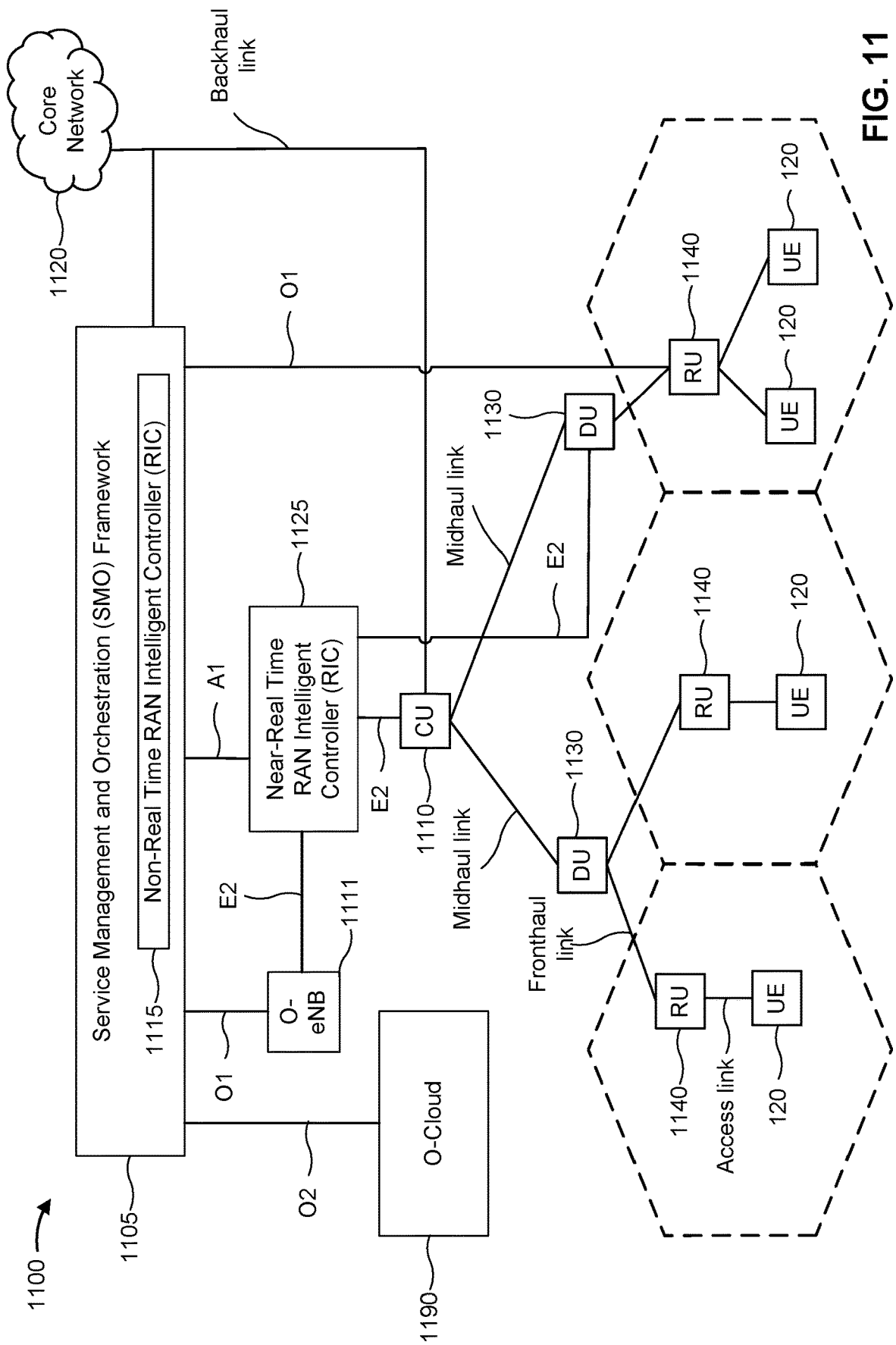
FIG. 11 is diagram illustrating an example disaggregated base station architecture.

In some aspects, the processing system 910 may be a component of the base station 110, the network entity 302, the network entity 1002, a unit of FIG. 11, among other examples and may include the memory 242 and/or at least one of the TX MIMO processor 230, the RX processor 238, and/or the controller/processor 240. In some aspects, the apparatus 905 for wireless communication includes means for transmitting, to a UE, a grant associated with a plurality of physical shared channel resources and/or means for receiving a communication, associated with the grant, including a downlink assignment index field with a value calculated based at least in part on the plurality of physical shared channels, wherein a configuration of the downlink assignment index field is based at least in part on a quantity of start and length indicator values configured for the UE, among other examples. The aforementioned means may be one or more of the aforementioned components of the apparatus 800 and/or the processing system 910 of the apparatus 905 configured to perform the functions recited by the aforementioned means. As described elsewhere herein, the processing system 910 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

Figure 10:
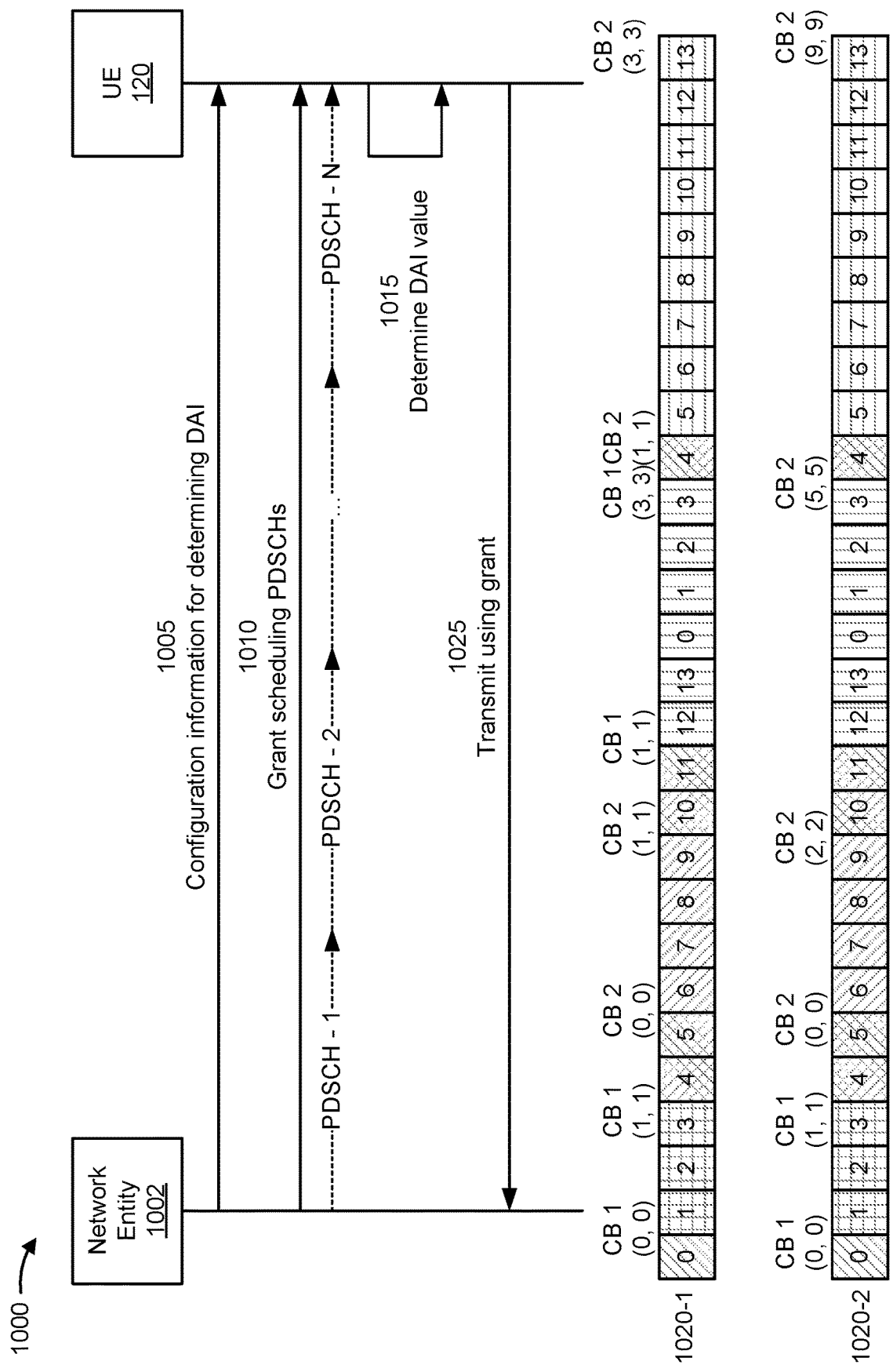
FIG. 10 is a diagram illustrating an example associated with downlink assignment index processing in in multiple physical downlink shared channel (PDSCH) (multi-PDSCH) scenarios.

FIG. 10 is a diagram illustrating an example 1000 associated with DAI processing in multi-PDSCH scenarios, in accordance with the present disclosure. As shown in FIG. 10, network entity 1002 and UE 120 may communicate with one another.

At 1005, UE 120 may receive configuration information for determining a DAI. For example, the UE 120 may receive radio resource control (RRC) configuration information identifying a time domain resource allocation (TDRA) table with rows that include a particular quantity of start and length indicator values (SLIVs). In some aspects, the number of SLIVs in the TDRA table may be one or more SLIVs. For example, different TDRA tables may have rows with different combinations of SLIVs, such as having 4 SLIVs or 8 SLIVs; 2 SLIVs, 4 SLIVs, or 8 SLIVs; or 3 SLIVs, 4 SLIVs, 6 SLIVs, or 8 SLIVs, among other examples. Additionally, or alternatively, UE 120 may receive configuration information identifying a grouping of TDRA tables. In some aspects, UE 120 may receive configuration information identifying a grouping of TDRA rows across TDRA tables. For example, when carrier aggregation is configured with sub-codebooks, as described in more detail below, UE 120 may group TDRA rows from different TDRA tables based at least in part on a greatest common divisor value.

In some aspects, UE 120 may receive configuration information identifying a DAI field size. For example, UE 120 may receive RRC signaling identifying the DAI field size. Additionally, or alternatively, UE 120 may receive information from which UE 120 may derive a DAI field size. For example, network entity 1002 may round a DAI bit-width up to a largest field size for a group of TDRA tables to maintain a DCI size, and UE 120 may determine the DAI size based at least in part on network entity 1002 rounding up the DAI bit-width.

At 1010, UE 120 may receive a grant scheduling using PDSCH resources. For example, UE 120 may receive a multi-PDSCH DCI scheduling transmission on a plurality of PDSCH resources. In this case, UE 120 may monitor for a set of PDSCH transmissions in a set of resources identified by the multi-PDSCH DCI and may generate feedback bits (e.g., hybrid automatic repeat request (HARQ) acknowledgement (ACK) bits or HARQ negative acknowledgement (NACK) bits) indicating whether a PDSCH transmission is successfully received in an identified resource.

At 1015, UE 120 may determine a DAI value. For example, UE 120 may determine a DAI value to signal to network entity 1002 to indicate a correspondence between a feedback message and a resource to which the feedback message applies. In this case, the DAI value may indicate a correspondence between a HARQ feedback message, including a set of ACK or NACK bits, and a set of resources, identified in the DCI, during which UE 120 monitored for a set of PDSCHs. Although FIG. 10 illustrates UE 120 determining the DAI value after monitoring for the PDSCHs, UE 120 may determine the DAI value and/or a size of the DAI field that includes the DAI value at another time, such as before monitoring for the set of PDSCHs.

In some aspects, UE 120 may determine the DAI based at least in part on a quantity of SLIVs in each row of a TDRA table. For example, when a TDRA table includes rows with 4 SLIVs or 8 SLIVs, UE 120 may increment the DAI for each set of 4 PDSCHs. Similarly, when the TDRA table includes rows with 2 SLIVs, 4 SLIVs, or 8 SLIVs, UE 120 may increment the DAI for each set of 2 PDSCHs. In these cases, UE 120 may determine the DAI based at least in part on a greatest common divisor of the numbers of SLIVs that can be in each row of the TDRA table. In these cases, UE 120 may transmit a single DAI for the TDRA table.

In some aspects, UE 120 may determine the DAI based at least in part on a set of sub-codebooks associated with a greatest common divisor of each group of rows of a TDRA table. For example, UE 120 may be configured with a TDRA table that includes rows with 3 SLIVs, 4 SLIVs, 6 SLIVs, or 8 SLIVs (e.g., a greatest common divisor of 1). Rather than increment the DAI for each (1) PDSCH, UE 120 may divide the TDRA table into a first group (e.g., corresponding to a first sub-codebook) including rows with 3 SLIVs or 6 SLIVs, and a second group (e.g., corresponding to a second sub-codebook) including rows with 4 SLIVs or 8 SLIVs. In this case, UE 120 may increment the DAI for the first group for each set of 3 PDSCHs and may increment the DAI for the second group for each set of 4 PDSCHs. At 1020-1, for a set of received grants with two sub-codebooks CB1 and CB2, UE 120 increments the DAI from (where the first digit is a counter DAI (cDAI or c) and the second digit is a total DAI (tDAI or t)) (0, 0) to (1, 1) for 1 set of 3 PDSCHs; UE 120 increments the DAI for the second group from (0, 0, to 1, 1) for 1 set of 4 PDSCHs; UE 120 increments the DAI for the first group from (1, 1) to (3, 3) for 2 sets of 3 PDSCHs; and UE 120 increments the DAI for the second group from (1, 1) to (3, 3) for 2 sets of 4 PDSCHs.

In another example, UE 120 may divide the TDRA table into a first group including rows with 3 SLIVs and a second group including rows with 4 SLIVs, 6 SLIVs, or 8 SLIVs. In this case, UE 120 may increment the DAI for the first group for each set of 3 PDSCHs and may increment the second group for each set of 2 SLIVs. At 1020-2, for a set of received grants with two sub-codebooks CB1 and CB2, UE 120 increments the DAI from (0, 0) to (1, 1) for 1 set of 3 PDSCHs; UE 120 increments the DAI for the second group from (0, 0, to 2, 2) for 2 sets of 2 PDSCHs; UE 120 increments the DAI for the second group from (2, 2) to (5, 5) for 3 sets of 2 PDSCHs; and UE 120 increments the DAI for the second group from (5, 5) to (9, 9) for 4 sets of 2 PDSCHs.

In some aspects, UE 120 may transmit one or more or DAI values. For example, for a multi-PUSCH grant of uplink resources for reporting the DAI, UE 120 may transmit two DAIS (e.g., one for each group) or a single DAI (e.g., for a single group in a case where network entity 1002 configures only a single group to be active at any time).

In some aspects, a resolution of the DAI (e.g., an increment of the DAT) may be based at least in part on a type of DCI received by UE 120. For example, UE 120 may apply the same resolution to DCI format 1_0 (e.g., an increment indicates the same quantity of HARQ ACK bits) as is applied to DCI format 1_1. In this case, when a non-fallback DCI includes a duration of 8 TDRAs, each grant is associated with 8 HARQ processes (e.g., in a non-fallback scenario) or 1 HARQ process (e.g., in a fallback scenario). If a fallback DCI is received and followed by a non-fallback DCI, the non-fallback DCI may indicate counter DAI (cDAI) values that are multiples of a configured amount (e.g., 8), so UE 120 may add padding bits to indicate values that are not multiples of the configured amount. Additional details regarding HARQ processes and fallback DCI may be described in 3GPP Technical Specification (TS) 38.213 Release 17, Version 17.0.0.

In some aspects, UE 120 may use different sub-codebooks for different DCI formats. For example, UE 120 may use a first sub-codebook for DCI format 1_0 and a second sub-codebook for DCI format 1_1. In this case, when the same DAI size is configured for both DCI types (e.g., DCI formats) and, for example, DCI 1_1 schedules a single PDSCH, UE 120 may group each HARQ bit associated with a single PDSCH grant into a single sub-codebook (e.g., based at least in part on a greatest common divisor for rows of the TDRA table excluding rows with a single SLIV). Additionally, or alternatively, UE 120 may use a different sub-codebook for the same DCI format. For example, UE 120 may use different sub-codebooks for non-fallback DCIS with different quantities of SLIVs.

In some aspects, UE 120 may selectively generate one or more NACK bits in connection with a conflict between semi-static time division duplex (TDD) communication and the multi-PDSCH grant. For example, when there is an overlap between a TDD uplink and one or more symbols of the multi-PDSCH grant, the UE 120 may skip at least one PDSCH corresponding to the one or more symbols. In this case, when UE 120 increments the DAI based at least in part on a quantity of SLIVs (e.g., UE 120 increments the DAI by 1 for each PDSCH), UE 120 may forgo generating NACK bits for the skipped at least one PDSCH (e.g., in a type-2 codebook). In contrast, if the DAI increment is based at least in part on the greatest common divisor, as described herein, UE 120 may generate a NACK corresponding to a skipped PDSCH to ensure codebook size alignment. In this case, if the quantity of skipped PDSCHs is less than a quantity of PDSCHs per DAI increment, UE 120 may generate NACK bits for each skipped PDSCH. As an example, if the DAI increment is 4 PDSCHs and a multi-PDSCH grant with 4 allocations has 1 allocation that overlaps with uplink TDD symbols and is skipped, UE 120 may generate a NACK for the 1 allocation with 4 ACK/NACK bits for each DAI increment.

In contrast, in a first option, if the quantity of skipped PDSCHs is greater than or equal to the quantity of PDSCHs per DAI increment, UE 120 may generate NACK bits for each skipped PDSCH and increment the DAI based at least in part on a total quantity of SLIVs in a TDRA table. For example, if the DAI increment is 2 PDSCHs and a multi-PDSCH grant has 4 allocations with 2 allocations overlapping with uplink TDD symbols and being skipped, UE 120 may generate 2 NACK bits for the skipped allocation, such that 4 ACK/NACK bits are generated and the DAI is incremented twice.

Similarly, in a second option, if the quantity of skipped PDSCHs N is greater than or equal to the quantity of PDSCHs per DAI M increment, UE 120 may generate NACK bits only for N-floor(N/M) PDSCHs and may increment the DAI based at least in part on a quantity of valid PDSCHs plus N-floor(N/M) skipped PDSCHs. For example, if the DAI increment is 2 PDSCHs and a multi-PDSCH grant has 4 allocations with 2 allocations overlapping with uplink TDD symbols and being skipped, UE 120 may generate ACK/NACK bits for the valid PDSCHs (2 PDSCHs) and increment the DAI once.

At 1025, UE 120 may transmit in connection with resources of the grant. For example, UE 120 may transmit feedback messages including an ACK or a NACK to indicate whether a PDSCH was successfully received using a resource of the grant. In this case, UE 120 may transmit a feedback message with a DAI to indicate a set of resources to which the feedback message and the ACK/NACK bits therein apply.

As indicated above, FIG. 10 is provided as an example. Other examples may differ from what is described with respect to FIG. 10.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 11 shows a diagram illustrating an example disaggregated base station 1100 architecture. The disaggregated base station 1100 architecture may include one or more central units (CUs) 1110 that can communicate directly with a core network 1120 via a backhaul link, or indirectly with the core network 1120 through one or more disaggregated base station units (such as a Near-Real Time (RT) (Near-RT) RAN Intelligent Controller (RIC) 1125 via an E2 link, or a Non-Real Time (Non-RT) RIC 1115 associated with a Service Management and Orchestration (SMO) Framework 1105, or both). A CU 1110 may communicate with one or more distributed units (DUs) 1130 via respective midhaul links, such as an F1 interface. The DUs 1130 may communicate with one or more radio units (RUs) 1140 via respective fronthaul links. The RUs 1140 may communicate with respective UEs 120 via one or more radio frequency (RF) access links. In some implementations, the UE 120 may be simultaneously served by multiple RUs 1140. In some aspects, one or more units (the CUs 1110, the DUs 1130, the RUs 1140, as well as the Near-RT RICs 1125, the Non-RT RICs 1115 and the SMO Framework 1105) may correspond to components of the base station 110, described above. Additionally, or alternatively, one or more base stations 110 may correspond to one or more of the units or one or more components thereof.

Each of the units may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1110. The CU 1110 may be configured to handle user plane functionality (Central Unit-User Plane (CU-UP)), control plane functionality (Central Unit-Control Plane (CU-CP)), or a combination thereof. In some implementations, the CU 1110 can be logically split into one or more CU-UP units and one or more CU-CP units. The CU-UP unit can communicate bidirectionally with the CU-CP unit via an interface, such as the E1 interface when implemented in an O-RAN configuration. The CU 1110 can be implemented to communicate with the DU 1130, as necessary, for network control and signaling.

The DU 1130 may correspond to a logical unit that includes one or more base station functions to control the operation of one or more RUs 1140. In some aspects, the DU 1130 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 1130 may further host one or more low PHY layers. Each layer (or module) can be implemented with an interface configured to communicate signals with other layers (and modules) hosted by the DU 1130, or with the control functions hosted by the CU 1110.

Lower-layer functionality can be implemented by one or more RUs 1140. In some deployments, an RU 1140, controlled by a DU 1130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1140 can be implemented to handle over the air (OTA) communication with one or more UEs 120. In some implementations, real-time and non-real-time aspects of control and user plane communication with the RU(s) 1140 can be controlled by the corresponding DU 1130. In some scenarios, this configuration can enable the DU(s) 1130 and the CU 1110 to be implemented in a cloud-based RAN architecture, such as a vRAN architecture.

The SMO Framework 1105 may be configured to support RAN deployment and provisioning of non-virtualized and virtualized network elements. For non-virtualized network elements, the SMO Framework 1105 may be configured to support the deployment of dedicated physical resources for RAN coverage requirements which may be managed via an operations and maintenance interface (such as an O1 interface). For virtualized network elements, the SMO Framework 1105 may be configured to interact with a cloud computing platform (such as an open cloud (O-Cloud) 1190) to perform network element life cycle management (such as to instantiate virtualized network elements) via a cloud computing platform interface (such as an O2 interface). Such virtualized network elements can include, but are not limited to, CUs 1110, DUs 1130, RUs 1140 and Near-RT RICs 1125. In some implementations, the SMO Framework 1105 can communicate with a hardware aspect of a 4G RAN, such as an open eNB (O-eNB) 1111, via an O1 interface. Additionally, in some implementations, the SMO Framework 1105 can communicate directly with one or more RUs 1140 via an O1 interface. The SMO Framework 1105 also may include a Non-RT RIC 1115 configured to support functionality of the SMO Framework 1105.

The Non-RT RIC 1115 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1125. The Non-RT RIC 1115 may be coupled to or communicate with (such as via an A1 interface) the Near-RT RIC 1125. The Near-RT RIC 1125 may be configured to include a logical function that enables near-real-time control and optimization of RAN elements and resources via data collection and actions over an interface (such as via an E2 interface) connecting one or more CUs 1110, one or more DUs 1130, or both, as well as an O-eNB, with the Near-RT RIC 1125.

In some implementations, to generate AI/ML models to be deployed in the Near-RT RIC 1125, the Non-RT RIC 1115 may receive parameters or external enrichment information from external servers. Such information may be utilized by the Near-RT RIC 1125 and may be received at the SMO Framework 1105 or the Non-RT RIC 1115 from non-network data sources or from network functions. In some examples, the Non-RT RIC 1115 or the Near-RT RIC 1125 may be configured to tune RAN behavior or performance. For example, the Non-RT RIC 1115 may monitor long-term trends and patterns for performance and employ AI/ML, models to perform corrective actions through the SMO Framework 1105 (such as reconfiguration via O1) or via creation of RAN management policies (such as A1 policies).

As indicated above, FIG. 11 is provided as an example. Other examples may differ from what is described with respect to FIG. 11.

The following provides an overview of some Aspects of the present disclosure:

Aspect 1: A method of wireless communication performed by a user equipment (UE), comprising: receiving a grant associated with a plurality of physical shared channel resources; and transmitting a communication, associated with the grant, including a downlink assignment index field with a value calculated based at least in part on the plurality of physical shared channels, wherein a configuration of the downlink assignment index field is based at least in part on a quantity of start and length indicator values configured for the UE.

Aspect 2: The method of Aspect 1, wherein the configuration of the downlink assignment index field is based at least in part on a greatest common divisor of the quantity of start and length indicator values in each row of a time domain resource allocation table configured for the UE.

Aspect 3: The method of any of Aspects 1 to 2, wherein the configuration of the downlink assignment index is based at least in part on a radio resource control configuration received from a network entity.

Aspect 4: The method of any of Aspects 1 to 3, wherein a plurality of sub-codebooks are defined based at least in part on a time domain resource allocation table configured for the UE, and wherein the configuration of the downlink assignment index field is based at least in part on a sub-code book of the plurality of sub-codebooks.

Aspect 5: The method of Aspect 4, wherein a division of the time domain resource allocation table into sub-codebooks, of the plurality of sub-codebooks, is based at least in part on a radio resource control configuration.

Aspect 6: The method of any of Aspects 1 to 5, wherein the communication is associated with another grant of a plurality of physical uplink shared channel resources and includes a plurality of downlink assignment indices corresponding to a plurality of groupings associated with a time domain resource allocation table.

Aspect 7: The method of any of Aspects 1 to 6, wherein the communication is associated with another grant of a plurality of physical uplink shared channel resources and includes a single downlink assignment index corresponding to a plurality of groupings associated with a time domain resource allocation table.

Aspect 8: The method of any of Aspects 1 to 7, wherein an increment of the downlink assignment index indicates a fixed quantity of feedback bits for downlink control information type 1_1 and for downlink control information type 1_0.

Aspect 9: The method of any of Aspects 1 to 8, wherein a first sub-codebook is defined for a first type of downlink control information and a second sub-codebook is defined for a second type of downlink control information, and wherein feedback bits associated with the downlink assignment index field are grouped in a common sub-codebook of the first sub-codebook or the second sub-codebook.

Aspect 10: The method of any of Aspects 1 to 9, wherein the downlink assignment index field is not incremented based at least in part on a skipped physical shared channel resource, of the plurality of physical shared channel resources, that overlaps with a time-division duplexed uplink transmission.

Aspect 11: The method of any of Aspects 1 to 10, wherein a quantity of physical shared channel resources, of the plurality of physical shared channel resources, that overlap with a time-division duplexed uplink transmission is less than a quantity of physical shared channel resources per downlink assignment index increment for the downlink assignment index field, and wherein the communication includes a feedback indicator of the physical shared channel resources.

Aspect 12: The method of any of Aspects 1 to 11, wherein a quantity of physical shared channel resources, of the plurality of physical shared channel resources, that overlap with a time-division duplexed uplink transmission is not less than a quantity of physical shared channel resources per downlink assignment index increment for the downlink assignment index field, and wherein the communication includes a feedback indicator of the physical shared channel resources and the downlink assignment index field is incremented based at least in part on a quantity of start and length indicator values in a time domain resources assignment table.

Aspect 13: The method of any of Aspects 1 to 12, wherein a quantity of physical shared channel resources, of the plurality of physical shared channel resources, that overlap with a time-division duplexed uplink transmission is not less than a quantity of physical shared channel resources per downlink assignment index increment for the downlink assignment index field, and wherein the communication includes a feedback indicator of a subset of the physical shared channel resources and the downlink assignment index field is incremented based at least in part on a quantity of start and length indicator values in a time domain resources assignment table and the subset of the physical shared channel resources.

Aspect 14: The method of any of Aspects 1 to 13, wherein the plurality of physical shared channel resources includes at least one of at least one physical uplink shared channel resource or at least one physical downlink shared channel resource.

Aspect 15: A method of wireless communication performed by a network entity, comprising: transmitting, to a user equipment (UE), a grant associated with a plurality of physical shared channel resources; and receiving a communication, associated with the grant, including a downlink assignment index field with a value calculated based at least in part on the plurality of physical shared channels, wherein a configuration of the downlink assignment index field is based at least in part on a quantity of start and length indicator values configured for the UE.

Aspect 16: The method of Aspect 15, wherein the configuration of the downlink assignment index field is based at least in part on a greatest common divisor of the quantity of start and length indicator values in each row of a time domain resource allocation table configured for the UE.

Aspect 17: The method of any of Aspects 15 to 16, wherein the configuration of the downlink assignment index is based at least in part on a radio resource control configuration transmitted by the network entity.

Aspect 18: The method of any of Aspects 15 to 17, wherein a plurality of sub-codebooks are defined based at least in part on a time domain resource allocation table configured for the UE, and wherein the configuration of the downlink assignment index field is based at least in part on a sub-code book of the plurality of sub-codebooks.

Aspect 19: The method of Aspect 18, wherein a division of the time domain resource allocation table into sub-codebooks, of the plurality of sub-codebooks, is based at least in part on a radio resource control configuration.

Aspect 20: The method of any of Aspects 15 to 19, wherein the communication is associated with another grant of a plurality of physical uplink shared channel resources and includes a plurality of downlink assignment indices corresponding to a plurality of groupings associated with a time domain resource allocation table.

Aspect 21: The method of any of Aspects 15 to 20, wherein the communication is associated with another grant of a plurality of physical uplink shared channel resources and includes a single downlink assignment index corresponding to a plurality of groupings associated with a time domain resource allocation table.

Aspect 22: The method of any of Aspects 15 to 21, wherein an increment of the downlink assignment index indicates a fixed quantity of feedback bits for downlink control information type 1_1 and for downlink control information type 1_0.

Aspect 23: The method of any of Aspects 15 to 22, wherein a first sub-codebook is defined for a first type of downlink control information and a second sub-codebook is defined for a second type of downlink control information, and wherein feedback bits associated with the downlink assignment index field are grouped in a common sub-codebook of the first sub-codebook or the second sub-codebook.

Aspect 24: The method of any of Aspects 15 to 23, wherein the downlink assignment index field is not incremented based at least in part on a skipped physical shared channel resource, of the plurality of physical shared channel resources, that overlaps with a time-division duplexed uplink transmission.

Aspect 25: The method of any of Aspects 15 to 24, wherein a quantity of physical shared channel resources, of the plurality of physical shared channel resources, that overlap with a time-division duplexed uplink transmission is less than a quantity of physical shared channel resources per downlink assignment index increment for the downlink assignment index field, and wherein the communication includes a feedback indicator of the physical shared channel resources.

Aspect 26: The method of any of Aspects 15 to 25, wherein a quantity of physical shared channel resources, of the plurality of physical shared channel resources, that overlap with a time-division duplexed uplink transmission is not less than a quantity of physical shared channel resources per downlink assignment index increment for the downlink assignment index field, and wherein the communication includes a feedback indicator of the physical shared channel resources and the downlink assignment index field is incremented based at least in part on a quantity of start and length indicator values in a time domain resources assignment table.

Aspect 27: The method of any of Aspects 15 to 26, wherein a quantity of physical shared channel resources, of the plurality of physical shared channel resources, that overlap with a time-division duplexed uplink transmission is not less than a quantity of physical shared channel resources per downlink assignment index increment for the downlink assignment index field, and wherein the communication includes a feedback indicator of a subset of the physical shared channel resources and the downlink assignment index field is incremented based at least in part on a quantity of start and length indicator values in a time domain resources assignment table and the subset of the physical shared channel resources.

Aspect 28: The method of any of Aspects 15 to 27, wherein the plurality of physical shared channel resources includes at least one of at least one physical uplink shared channel resource or at least one physical downlink shared channel resource.

Aspect 29: A method of wireless communication performed by a user equipment (UE), comprising: receiving a grant associated with a plurality of physical shared channel resources; and transmitting a communication associated with the grant, wherein the communication is associated with at least one of a first sub-codebook for a first type of downlink control information or a second sub-codebook for a second type of downlink control information.

Aspect 30: The method of claim 29, wherein feedback bits associated with the downlink assignment index field are grouped in a common sub-codebook of the first sub-codebook or the second sub-codebook.

Aspect 31: The method of any of claims 29 to 30, wherein the communication includes including a downlink assignment index field with a value calculated based at least in part on the plurality of physical shared channels.

Aspect 32: The method of claim 31, wherein a configuration of the downlink assignment index field is based at least in part on a quantity of start and length indicator values configured for the UE.

Aspect 33: The method of any of claims 29 to 32, wherein the first type of downlink control information or the second type of downlink control information includes at least one of: downlink control information format 1_0, or downlink control information format 1_1.

Aspect 34: A method of wireless communication performed by a network entity, comprising: transmitting a grant associated with a plurality of physical shared channel resources; and receiving a communication associated with the grant, wherein the communication is associated with at least one of a first sub-codebook for a first type of downlink control information or a second sub-codebook for a second type of downlink control information.

Aspect 35: The method of claim 34, wherein feedback bits associated with the downlink assignment index field are grouped in a common sub-codebook of the first sub-codebook or the second sub-codebook.

Aspect 36: The method of any of claims 34 to 35, wherein the communication includes including a downlink assignment index field with a value calculated based at least in part on the plurality of physical shared channels.

Aspect 37: The method of claim 36, wherein a configuration of the downlink assignment index field is based at least in part on a quantity of start and length indicator values configured for the UE.

Aspect 38: The method of any of claims 34 to 37, wherein the first type of downlink control information or the second type of downlink control information includes at least one of: downlink control information format 1_0, or downlink control information format 1_1.

Aspect 39: An apparatus for wireless communication at a device, comprising a processor; memory coupled with the processor; and instructions stored in the memory and executable by the processor to cause the apparatus to perform the method of one or more of Aspects 1-14.

Aspect 40: A device for wireless communication, comprising a memory and one or more processors coupled to the memory, the one or more processors configured to perform the method of one or more of Aspects 1-14.

Aspect 41: An apparatus for wireless communication, comprising at least one means for performing the method of one or more of Aspects 1-14.

Aspect 42: A non-transitory computer-readable medium storing code for wireless communication, the code comprising instructions executable by a processor to perform the method of one or more of Aspects 1-14.

Aspect 43: A non-transitory computer-readable medium storing a set of instructions for wireless communication, the set of instructions comprising one or more instructions that, when executed by one or more processors of a device, cause the device to perform the method of one or more of Aspects 1-14.

Aspect 44: An apparatus for wireless communication at a device, comprising a processor; memory coupled with the processor; and instructions stored in the memory and executable by the processor to cause the apparatus to perform the method of one or more of Aspects 15-28.

Aspect 45: A device for wireless communication, comprising a memory and one or more processors coupled to the memory, the one or more processors configured to perform the method of one or more of Aspects 15-28.

Aspect 46: An apparatus for wireless communication, comprising at least one means for performing the method of one or more of Aspects 15-28.

Aspect 47: A non-transitory computer-readable medium storing code for wireless communication, the code comprising instructions executable by a processor to perform the method of one or more of Aspects 15-28.

Aspect 48: A non-transitory computer-readable medium storing a set of instructions for wireless communication, the set of instructions comprising one or more instructions that, when executed by one or more processors of a device, cause the device to perform the method of one or more of Aspects 15-28.

Aspect 49: An apparatus for wireless communication at a device, comprising a processor; memory coupled with the processor; and instructions stored in the memory and executable by the processor to cause the apparatus to perform the method of one or more of Aspects 29-33.

Aspect 50: A device for wireless communication, comprising a memory and one or more processors coupled to the memory, the one or more processors configured to perform the method of one or more of Aspects 29-33.

Aspect 51: An apparatus for wireless communication, comprising at least one means for performing the method of one or more of Aspects 29-33.

Aspect 52: A non-transitory computer-readable medium storing code for wireless communication, the code comprising instructions executable by a processor to perform the method of one or more of Aspects 29-33.

Aspect 53: A non-transitory computer-readable medium storing a set of instructions for wireless communication, the set of instructions comprising one or more instructions that, when executed by one or more processors of a device, cause the device to perform the method of one or more of Aspects 29-33.

Aspect 54: An apparatus for wireless communication at a device, comprising a processor; memory coupled with the processor; and instructions stored in the memory and executable by the processor to cause the apparatus to perform the method of one or more of Aspects 34-38.

Aspect 55: A device for wireless communication, comprising a memory and one or more processors coupled to the memory, the one or more processors configured to perform the method of one or more of Aspects 34-38.

Aspect 56: An apparatus for wireless communication, comprising at least one means for performing the method of one or more of Aspects 34-38.

Aspect 57: A non-transitory computer-readable medium storing code for wireless communication, the code comprising instructions executable by a processor to perform the method of one or more of Aspects 34-38.

Aspect 58: A non-transitory computer-readable medium storing a set of instructions for wireless communication, the set of instructions comprising one or more instructions that, when executed by one or more processors of a device, cause the device to perform the method of one or more of Aspects 34-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, the one or more processors configured individually or collectively to cause the UE to:
receive a grant associated with a plurality of physical shared channel resources; and
transmit a communication associated with the grant, wherein:
the communication is associated with at least one of a first sub-codebook for a first type of downlink control information or a second sub-codebook for a second type of downlink control information, and feedback bits associated with a downlink assignment index field are grouped in a common sub-codebook of the first sub-codebook or the second sub-codebook.

2. The UE of claim 1, wherein the communication includes including the downlink assignment index field with a value calculated based at least in part on the plurality of physical shared channels.

3. The UE of claim 2, wherein a configuration of the downlink assignment index field is based at least in part on a quantity of start and length indicator values configured for the UE.

4. The UE of claim 1, wherein the first type of downlink control information or the second type of downlink control information includes at least one of:
downlink control information format 1_0, or
downlink control information format 1_1.

5. A user equipment (UE) for wireless communication, comprising:
one or more memories; and
one or more processors, coupled to the one or more memories, the one or more processors configured individually or collectively to cause the UE to:
receive a grant associated with a plurality of physical shared channel resources; and
transmit a communication, associated with the grant, including a downlink assignment index field with a value calculated based at least in part on the plurality of physical shared channels, wherein:
a configuration of the downlink assignment index field is based at least in part on a quantity of start and length indicator values configured for the UE, and
the configuration of the downlink assignment index field is based at least in part on a greatest common divisor of the quantity of start and length indicator values in each row of a time domain resource allocation table configured for the UE.

6. The UE of claim 5, wherein the configuration of the downlink assignment index field is based at least in part on a radio resource control configuration received from a network entity.

7. The UE of claim 5, wherein a plurality of sub-codebooks are defined based at least in part on the time domain resource allocation table configured for the UE, and wherein the configuration of the downlink assignment index field is based at least in part on a sub-code book of the plurality of sub-codebooks.

8. The UE of claim 7, wherein a division of the time domain resource allocation table into sub-codebooks, of the plurality of sub-codebooks, is based at least in part on a radio resource control configuration.

9. The UE of claim 5, wherein the communication is associated with another grant of a plurality of physical uplink shared channel resources and includes a plurality of downlink assignment indices corresponding to a plurality of groupings associated with a time domain resource allocation table.

10. The UE of claim 5, wherein the communication is associated with another grant of a plurality of physical uplink shared channel resources and includes a single downlink assignment index corresponding to a plurality of groupings associated with a time domain resource allocation table.

11. The UE of claim 5, wherein an increment of a downlink assignment index of the downlink assignment index field indicates a fixed quantity of feedback bits for downlink control information type 1_1 and for downlink control information type 1_0.

12. The UE of claim 5, wherein a first sub-codebook is defined for a first type of downlink control information and a second sub-codebook is defined for a second type of downlink control information.

13. The UE of claim 12, wherein feedback bits associated with the downlink assignment index field are grouped in a common sub-codebook of the first sub-codebook or the second sub-codebook.

14. The UE of claim 5, wherein the downlink assignment index field is not incremented based at least in part on a skipped physical shared channel resource, of the plurality of physical shared channel resources, that overlaps with a time-division duplexed uplink transmission.

15. The UE of claim 5, wherein a quantity of physical shared channel resources, of the plurality of physical shared channel resources, that overlap with a time-division duplexed uplink transmission is less than a quantity of physical shared channel resources per downlink assignment index increment for the downlink assignment index field, and
wherein the communication includes a feedback indicator of the physical shared channel resources.

16. The UE of claim 5, wherein a quantity of physical shared channel resources, of the plurality of physical shared channel resources, that overlap with a time-division duplexed uplink transmission is not less than a quantity of physical shared channel resources per downlink assignment index increment for the downlink assignment index field, and
wherein the communication includes a feedback indicator of the physical shared channel resources and the downlink assignment index field is incremented based at least in part on a quantity of start and length indicator values in a time domain resources assignment table.

17. The UE of claim 5, wherein a quantity of physical shared channel resources, of the plurality of physical shared channel resources, that overlap with a time-division duplexed uplink transmission is not less than a quantity of physical shared channel resources per downlink assignment index increment for the downlink assignment index field, and
wherein the communication includes a feedback indicator of a subset of the physical shared channel resources and the downlink assignment index field is incremented based at least in part on a quantity of start and length indicator values in a time domain resources assignment table and the subset of the physical shared channel resources.

18. The UE of claim 5, wherein the plurality of physical shared channel resources includes at least one of at least one physical uplink shared channel resource or at least one physical downlink shared channel resource.

19. A network entity for wireless communication, comprising:
a memory; and
one or more processors, coupled to the memory, configured to:
transmit, to a user equipment (UE), a grant associated with a plurality of physical shared channel resources; and
receive a communication, associated with the grant, including a downlink assignment index field with a value calculated based at least in part on the plurality of physical shared channels, wherein:

a configuration of the downlink assignment index field is based at least in part on a quantity of start and length indicator values configured for the UE, and the configuration of the downlink assignment index field is based at least in part on a greatest common divisor of the quantity of start and length indicator values in each row of a time domain resource allocation table configured for the UE.

20. The network entity of claim 19, wherein a plurality of sub-codebooks are defined based at least in part on a time domain resource allocation table configured for the UE, and wherein the configuration of the downlink assignment index field is based at least in part on a sub-code book of the plurality of sub-codebooks.

21. The network entity of claim 20, wherein a division of the time domain resource allocation table into sub-codebooks, of the plurality of sub-codebooks, is based at least in part on a radio resource control configuration.

22. The network entity of claim 19, wherein an increment of a downlink assignment index of the downlink assignment index field indicates a fixed quantity of feedback bits for downlink control information type 1_1 and for downlink control information type 1_0.

23. The network entity of claim 19, wherein a first sub-codebook is defined for a first type of downlink control information and a second sub-codebook is defined for a second type of downlink control information.

24. The network entity of claim 23, wherein feedback bits associated with the downlink assignment index field are grouped in a common sub-codebook of the first sub-codebook or the second sub-codebook.

25. A method of wireless communication performed by a user equipment (UE), comprising:

receiving a grant associated with a plurality of physical shared channel resources; and transmitting a communication, associated with the grant, including a downlink assignment index field with a value calculated based at least in part on the plurality of physical shared channels, wherein:

a configuration of the downlink assignment index field is based at least in part on a quantity of start and length indicator values configured for the UE; and the configuration of the downlink assignment index field is based at least in part on a greatest common divisor of the quantity of start and length indicator values in each row of a time domain resource allocation table configured for the UE.

26. The method of claim 25, wherein a first sub-codebook is defined for a first type of downlink control information and a second sub-codebook is defined for a second type of downlink control information.

27. The method of claim 26, wherein feedback bits associated with the downlink assignment index field are grouped in a common sub-codebook of the first sub-codebook or the second sub-codebook.

28. The method of claim 25, wherein the communication is associated with another grant of a plurality of physical uplink shared channel resources and includes a plurality of downlink assignment indices corresponding to a plurality of groupings associated with a time domain resource allocation table.

29. The method of claim 25, wherein the communication is associated with another grant of a plurality of physical uplink shared channel resources and includes a single downlink assignment index corresponding to a plurality of groupings associated with a time domain resource allocation table.

30. The method of claim 25, wherein an increment of the downlink assignment index field indicates a fixed quantity of feedback bits for downlink control information type 1_1 and for downlink control information type 1_0.

* * * * *